United States Patent
Zhang

(10) Patent No.: US 11,898,868 B2
(45) Date of Patent: Feb. 13, 2024

(54) SYSTEM AND METHOD FOR IDENTIFYING REDUNDANT ROAD LANE DETECTIONS

(71) Applicant: HERE Global B.V., Eindhoven (NL)

(72) Inventor: Zhenhua Zhang, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 193 days.

(21) Appl. No.: 17/472,273

(22) Filed: Sep. 10, 2021

(65) Prior Publication Data

US 2023/0096065 A1   Mar. 30, 2023

(51) Int. Cl.
  *G01C 21/00* (2006.01)
  *G06K 9/62* (2022.01)
  (Continued)

(52) U.S. Cl.
  CPC ......... *G01C 21/3833* (2020.08); *G01C 21/20* (2013.01); *G01C 21/3815* (2020.08);
  (Continued)

(58) Field of Classification Search
  CPC ......... B60W 60/0027; B60W 2420/42; B60W 2552/10; B60W 2554/4026; B60W 2554/4029; B60W 2554/4041; B60W 2554/4044; B60W 2552/53; B60W 2554/801; G05D 1/0214; G05D 1/0221; G05D 1/0231; G05D 2201/0213; G05D 1/0217; G06N 5/02; G06N 20/00; G06N 5/01; G06N 20/20; G06N 3/0464
  See application file for complete search history.

(56) References Cited

U.S. PATENT DOCUMENTS

| | | |
|---|---|---|
| 10,533,863 B2 | 1/2020 | Ma et al. |
| 2018/0012084 A1* | 1/2018 | Okano ............... G06V 20/588 |

(Continued)

FOREIGN PATENT DOCUMENTS

CN  111860319 A  10/2020

OTHER PUBLICATIONS

Marzougui et al., "A Lane Tracking Method Based on Progressive Probabilistic Hough Transform", Article in IEEE Access, vol. 8, May 4, 2020, 13 Pages.

(Continued)

*Primary Examiner* — Anne Marie Antonucci
*Assistant Examiner* — Misa H Nguyen

(57) ABSTRACT

A system for identifying redundant road lane detections in map data and subsequently updating the map data to remove the redundant road lane detections is provided. The system may be configured to determine, based on sensor data, a plurality of road lane detections associated with a road link represented by the map data. The system is further configured to determine a cluster for the road link based on a clustering criterion. The system is further configured to establish a plurality of road lane detection groups based on connectivity of the road lane detections in the cluster. The plurality of road lane detection groups is evaluated to identify one or more redundant road lane detections based on one or more of a parallel-detection criterion or a heading difference criterion. The identified redundant road lane detections are used to update the map data by a computer-implemented update process.

17 Claims, 14 Drawing Sheets

(51) Int. Cl.
    *G06K 9/00*          (2022.01)
    *G08G 1/056*        (2006.01)
    *G01C 21/20*        (2006.01)
    *G06V 20/56*        (2022.01)
    *G06F 18/232*       (2023.01)

(52) U.S. Cl.
    CPC .......... *G06F 18/232* (2023.01); *G06V 20/588* (2022.01); *G08G 1/056* (2013.01)

(56) References Cited

U.S. PATENT DOCUMENTS

| | | | |
|---|---|---|---|
| 2018/0189578 A1* | 7/2018 | Yang | B60W 40/04 |
| 2019/0130182 A1* | 5/2019 | Zang | G06V 20/182 |
| 2020/0193173 A1 | 6/2020 | Zhang et al. | |
| 2020/0393265 A1 | 12/2020 | Piao et al. | |

OTHER PUBLICATIONS

Li et al., "Lane Marking Detection and Reconstruction with Line-Scan Imaging Data", Article, Sensors (Basel). May 20, 2018, 18(5), pp. 1-22.

* cited by examiner

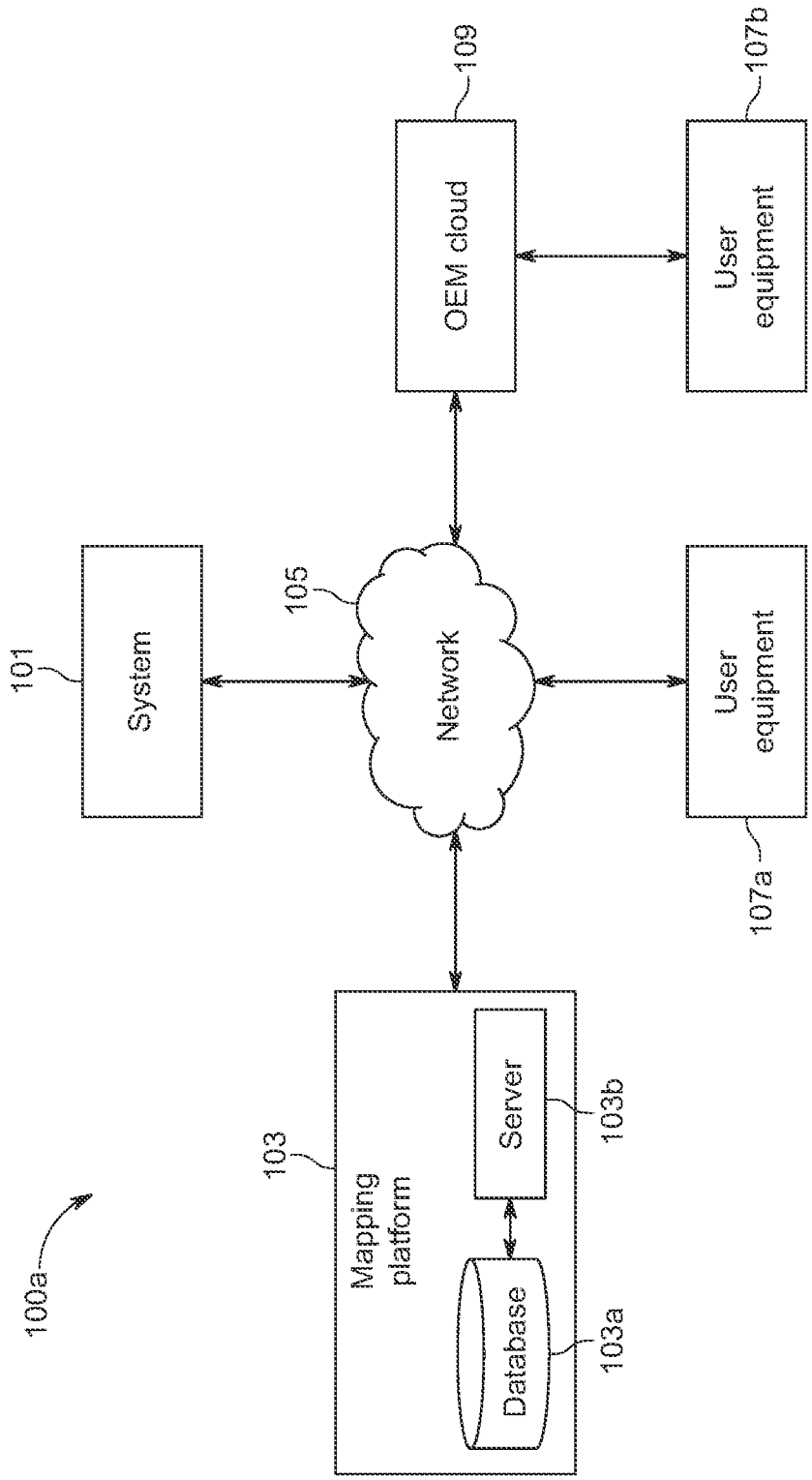

SYSTEM AND METHOD FOR IDENTIFYING REDUNDANT ROAD LANE DETECTIONS

TECHNOLOGICAL FIELD

The present disclosure generally relates to routing and navigation systems, and more particularly relates to methods and systems for identifying redundant detection data in routing and navigation systems.

BACKGROUND

Currently, various navigation systems are available for vehicle navigation. These navigation systems generally request navigation related data or map data thereof from a navigation service. The map data stored in the navigation service may be updated by sensor data. For example, the sensor data may include data about linear features, such as road lane detection data, lane marking data, data about guardrails, traffic sign data, roadwork zone detection data, and the like, on a route. The sensor data should be accurate to accurately provide the vehicle navigation. However, in most of cases, the sensor data may not be accurate due one of many reasons such as incorrect sensor detection, duplicate or redundant sensor detections, incorrect reporting of vehicle observations and the like. This leads to a decrease in availability of quality sensor data for mapping and navigation services.

Thus, there is a need to overcome the challenges of incorrect and low-quality sensor data detection, in order to provide high quality, accurate, and reliable data for mapping and navigation services.

BRIEF SUMMARY OF SOME EXAMPLE EMBODIMENTS

Generally, the sensor data that includes the data about map based and geographical features like links, road lanes, guardrails, lane markings, traffic signs, traffic cones etc., may not be accurate, due to reasons cited above, as well as due to occlusions (caused by interference of other vehicles), noise in sensors, or other defects in the sensors. This sensor data also includes data about road lane detections, which may be sensor captured data of lane markings on a road, a road segment, or a link. This data needs to be accurate for provision of accurate guidance for vehicle navigation, specifically in case of autonomous or semi-autonomous vehicles. If the sensor data about road lane detections is not accurate, it may lead to inaccurate navigation guidance, which may be hazardous and lead to accidents. Additionally, with the prevalence of fast high-definition maps, image data shown on a mapping navigation service's display interface needs to be of high-quality, have high precision and real-time update, otherwise it depletes the overall quality of sensor data.

In order to solve the foregoing problems, a system, a method, and a computer program product are provided in accordance with an example embodiment for identifying accurate road lane detection data by removing redundancies (or inaccuracies) in the road lane detection data. The redundancies may be related to such as parallel or incorrect lane marking detections.

In one aspect, a system for identifying redundant road lane detections is disclosed. The system comprises a memory configured to store computer-executable instructions and at least one processor configured to execute the computer-executable instructions. The computer executable instructions configured to: determine, based on sensor data, a plurality of road lane detections associated with a road link represented by map data. Further, a cluster associated with the road link is determined in accordance with a clustering criterion, the cluster including at least some of the plurality of road lane detections. The system is configured to establish a plurality of road lane detection groups by one or more of (i) respectively grouping any road lane detections of the cluster that are connected with one another, or (ii) establishing a given road lane detection group respectively for each unconnected road lane detection of the cluster. The system is further configured to identify, from among the plurality of road lane detections, one or more redundant road lane detections by evaluating one or more of the plurality of road lane detection groups according to one or more of a parallel-detection criterion or a heading-difference criterion. Additionally, the system is configured to perform a computer-implemented update process to remove the identified one or more redundant road lane detections from the map data.

In additional system embodiments, determining the cluster associated with the road link comprises determining, for each road lane detection in the plurality of road lane detections, a corresponding matched distance based on a distance of separation of the road lane detection from the road link, wherein the distance of separation is identified based on the map data. Further, the cluster is determined by using the matched distance as the clustering criterion, such that the cluster includes at least some of the plurality of road lane detections which have the same matched distance.

In additional system embodiments, identifying the one or more redundant road lane detections by evaluating one or more of the plurality of road lane detection groups according to the parallel-detection criterion comprises: identifying at least two road lane detection groups in the plurality of road lane detection groups that are parallel to each other; determining a respective length associated with each of the at least two road lane detection groups; and identifying the one or more redundant road lane detections based on the respective length associated with each of the at least two road lane detection groups.

In additional system embodiments, identifying the one or more redundant road lane detections comprises identifying the road lane detections associated with road lane detection group with shorter respective length as the one or more redundant road lane detections.

In additional system embodiments, identifying the one or more redundant road lane detections comprises identifying the road lane detections associated with road lane detection group with longer respective length as the one or more redundant road lane detections.

In additional system embodiments, identifying the one or more redundant road lane detections by evaluating one or more of the plurality of road lane detection groups according to the heading difference criterion comprises: determining, for each road lane detection in a road lane detection group of the plurality of road lane detection groups, a road lane detection heading value; determining, for the road lane detection group, a group heading value; calculating, a heading difference value between the road lane detection heading value of each road lane detection and the group heading value; and detecting the road lane detection having the heading difference value more than a predetermined heading difference value threshold as the redundant road lane detection.

In additional system embodiments, identifying the one or more redundant road lane detections comprises evaluating the one or more of the plurality of road lane detection groups according to a lateral position criterion associated with lateral placement of each road lane detection on the road link.

In additional system embodiments, the at least one processor is further configured to generate one or more navigation instructions based on the updated map data.

In another aspect, a method for identifying redundant road lane detections is provided. The method comprises determining, based on sensor data, a plurality of road lane detections associated with a road link represented by map data. The method further comprises determining a cluster associated with the road link in accordance with a clustering criterion, the cluster including at least some of the plurality of road lane detections. The method further comprises establishing a plurality of road lane detection groups by one or more of (i) respectively grouping any road lane detections of the cluster that are connected with one another, or (ii) establishing a given road lane detection group respectively for each unconnected road lane detection of the cluster. The method also comprises identifying, from among the plurality of road lane detections, one or more redundant road lane detections by evaluating one or more of the plurality of road lane detection groups according to one or more of a parallel-detection criterion or a heading-difference criterion. Additionally, the method includes performing a computer-implemented update process to remove the identified one or more redundant road lane detections from the map data.

In yet another aspect, a computer program product comprising a non-transitory computer readable medium having stored thereon computer executable instructions is provided. The computer executable instructions, when executed by at least one processor, cause the at least one processor to carry out operations for identifying redundant road lane detections, the operations comprising: determining, based on sensor data, a plurality of road lane detections associated with a road link represented by map data; determining a cluster associated with the road link in accordance with a clustering criterion, the cluster including at least some of the plurality of road lane detections; establishing a plurality of road lane detection groups by one or more of (i) respectively grouping any road lane detections of the cluster that are connected with one another, or (ii) establishing a given road lane detection group respectively for each unconnected road lane detection of the cluster; identifying, from among the plurality of road lane detections, one or more redundant road lane detections by evaluating one or more of the plurality of road lane detection groups according to one or more of a parallel-detection criterion or a heading-difference criterion; and performing a computer-implemented update process to remove the identified one or more redundant road lane detections from the map data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

Figure 1B:
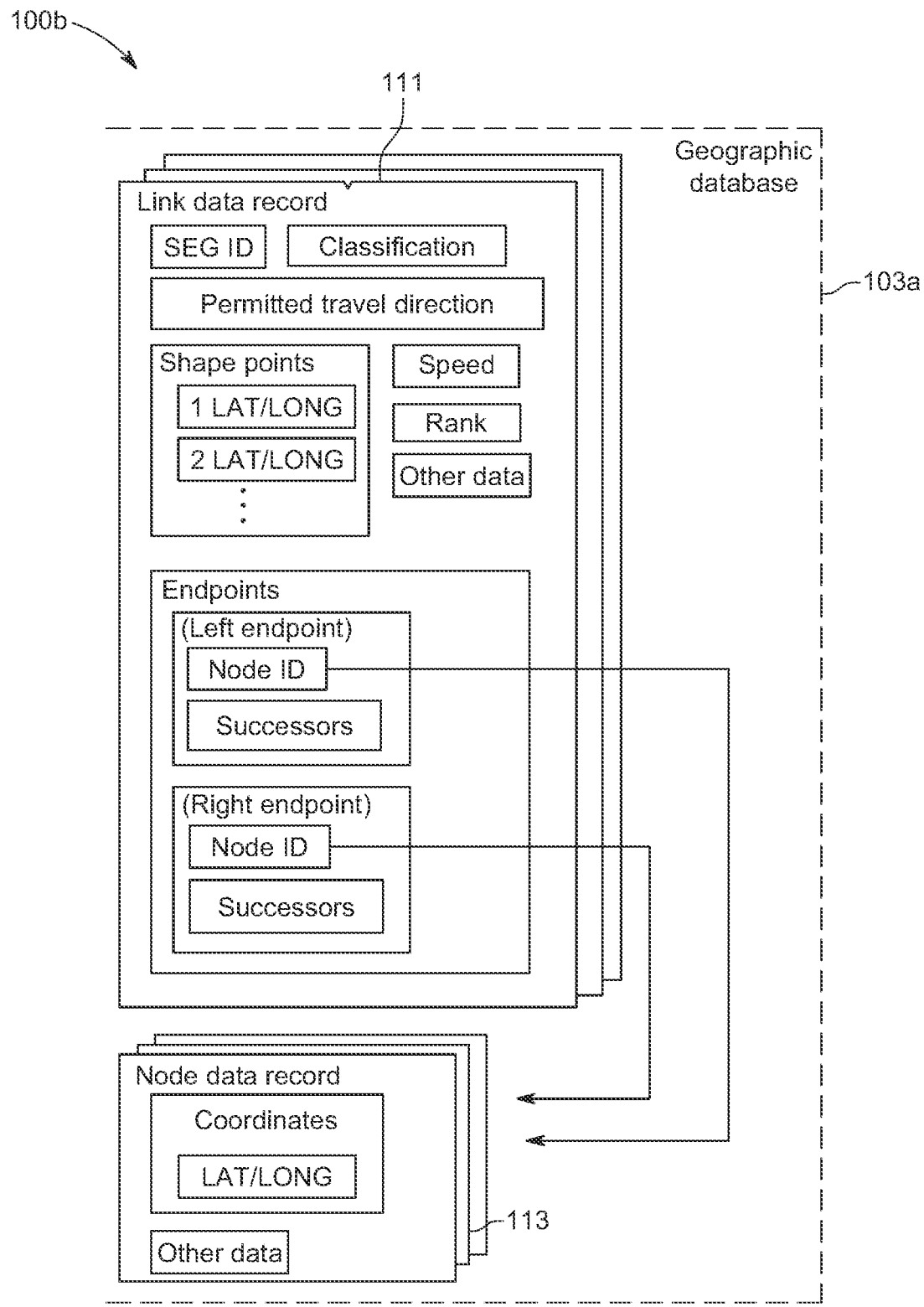
Figure 1C:
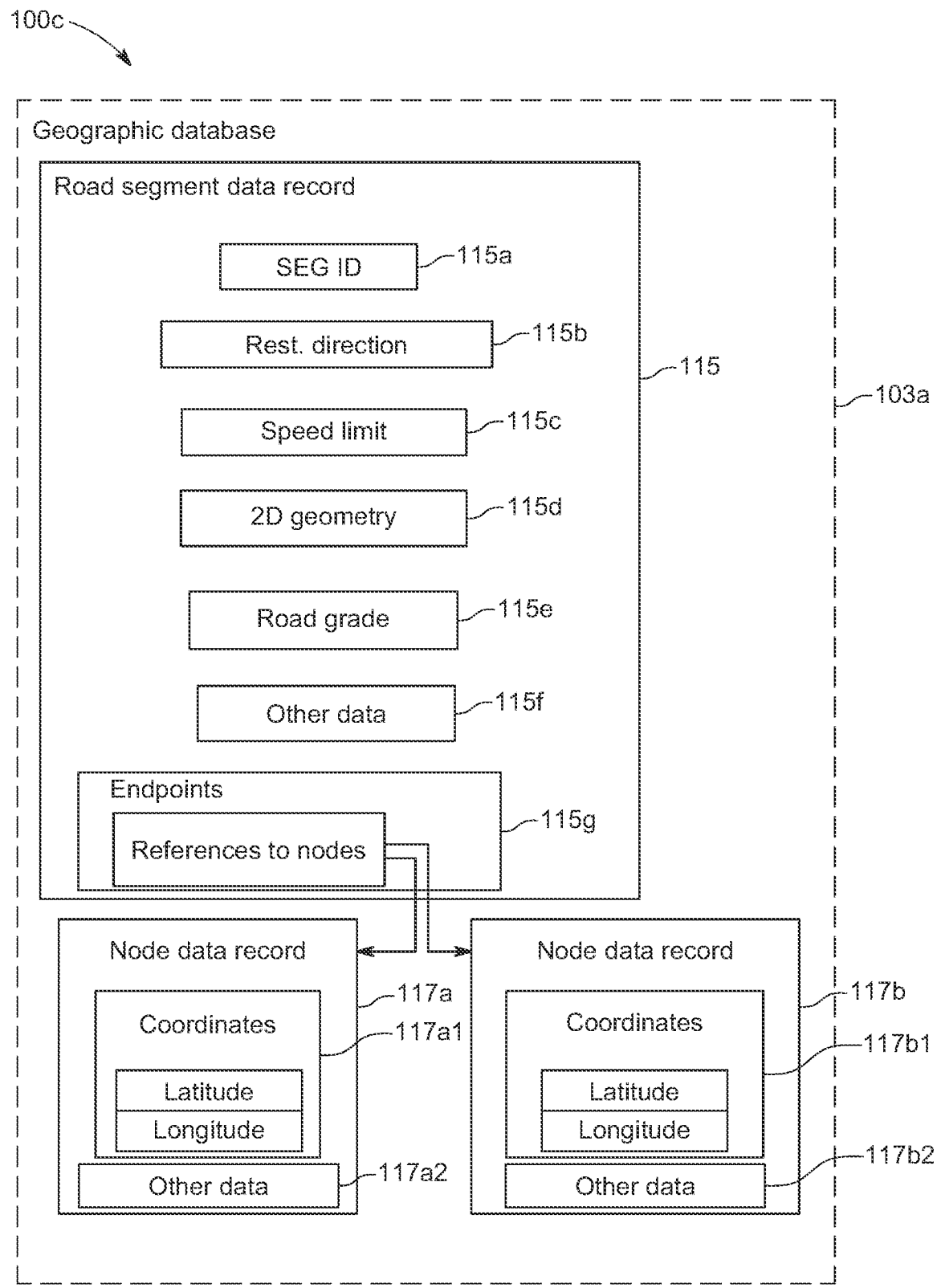
Figure 1D:
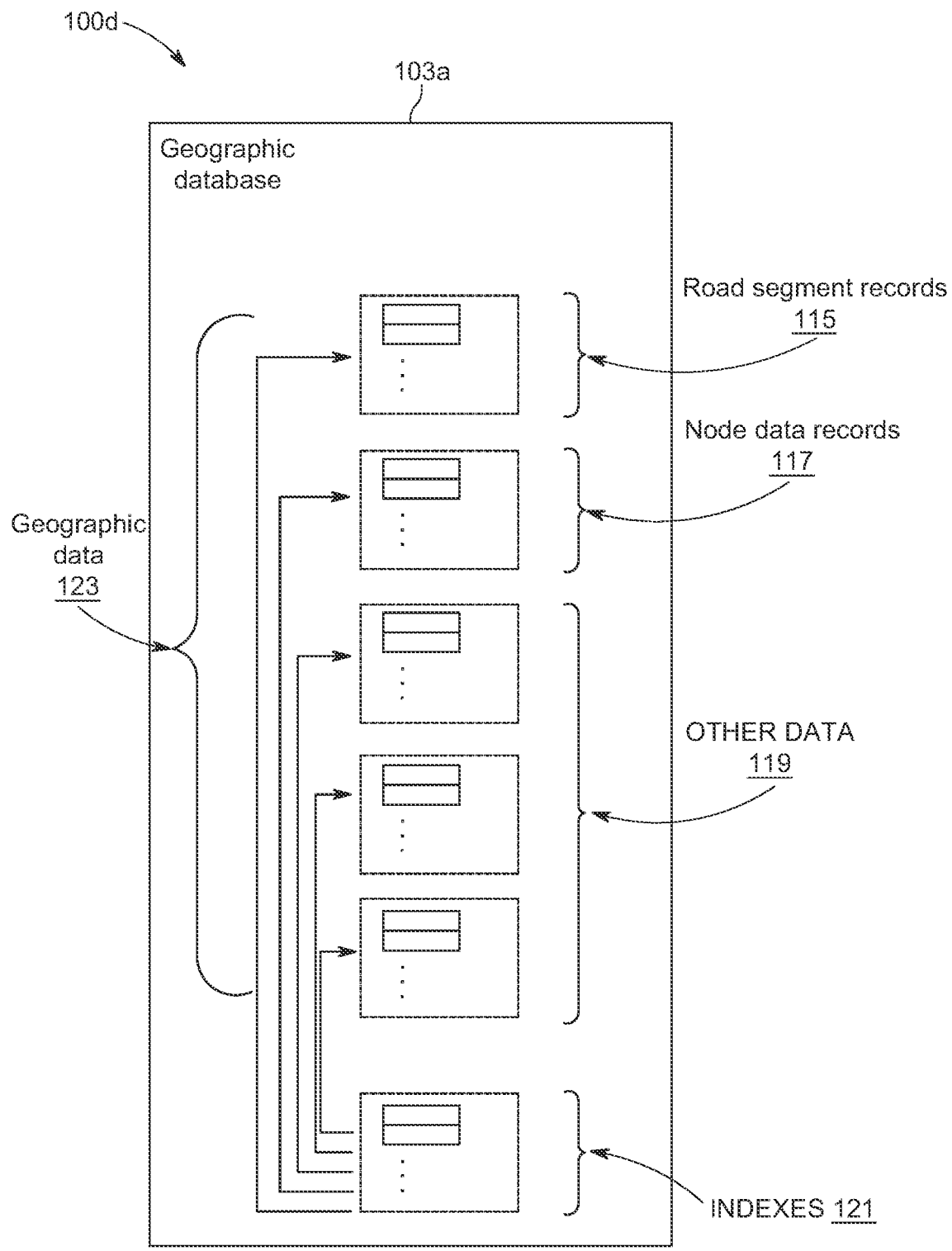
Figure 2:
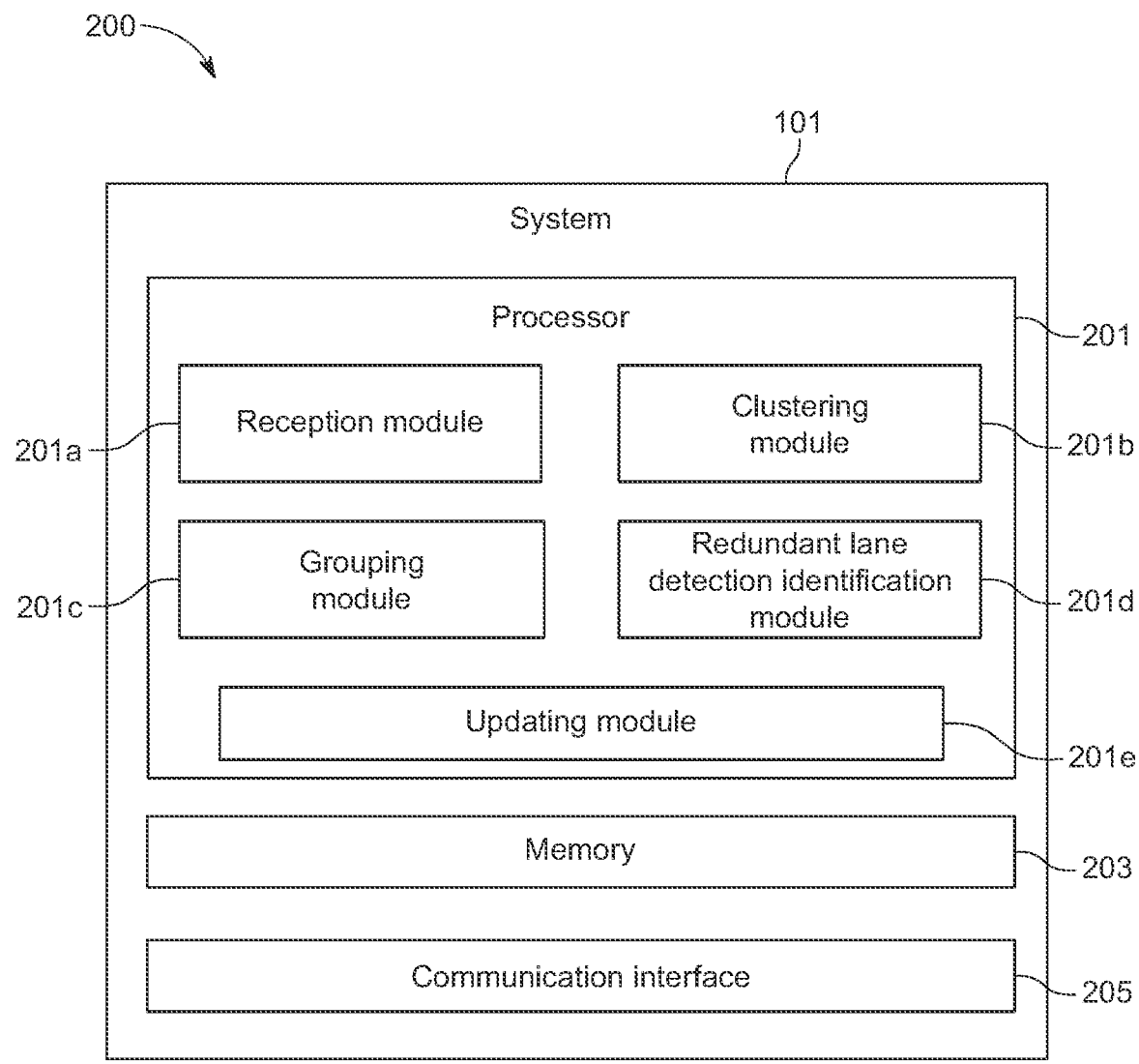
Figure 3:
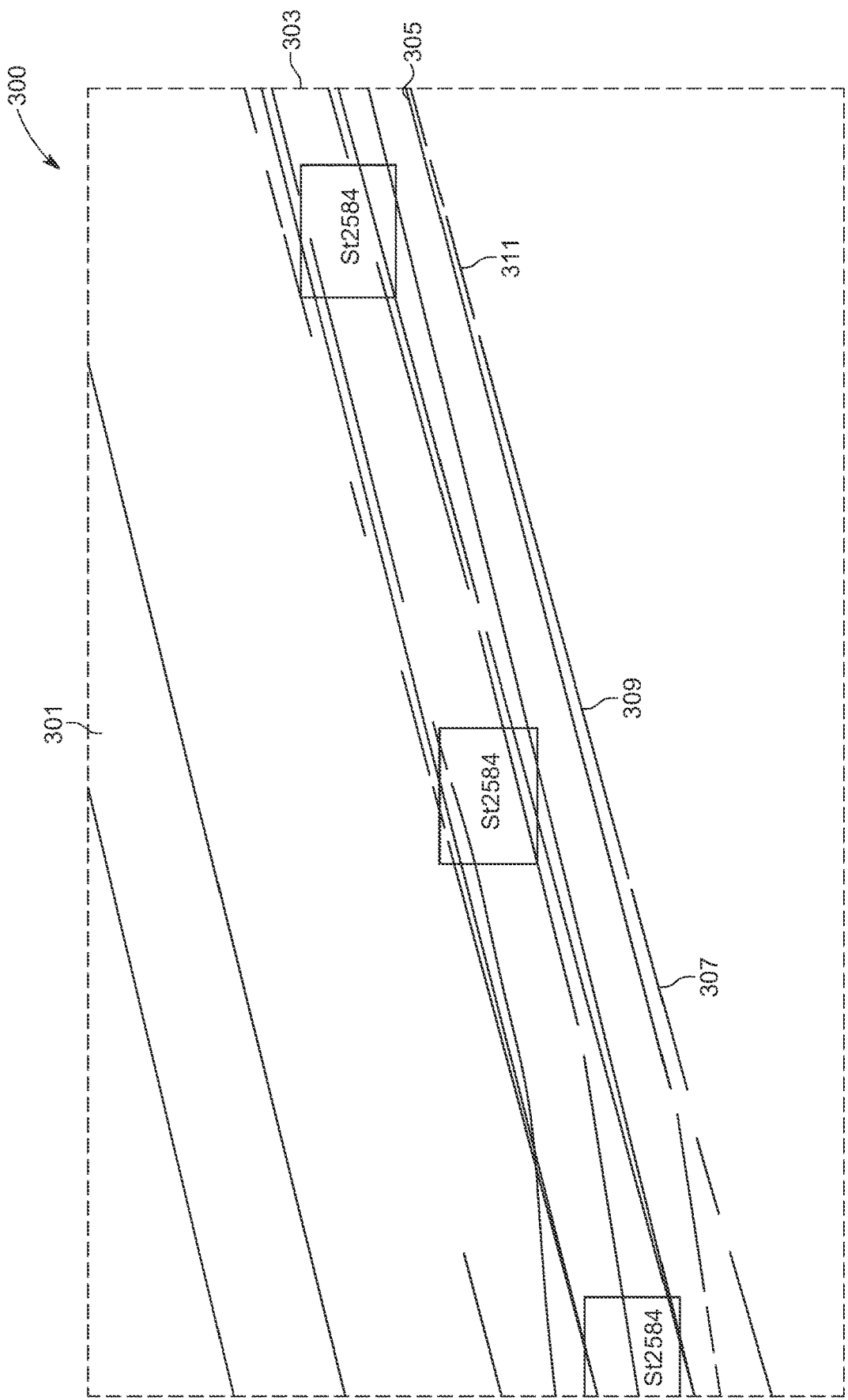
Figure 4:
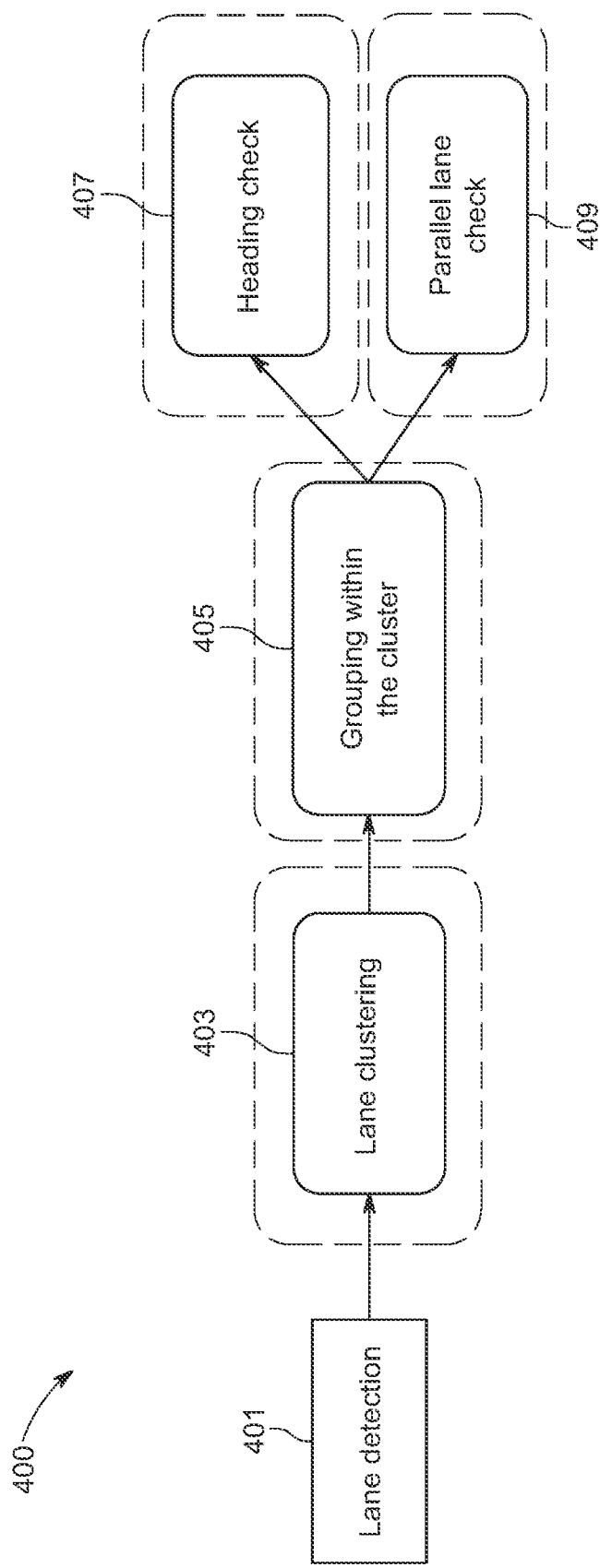
Figure 5:
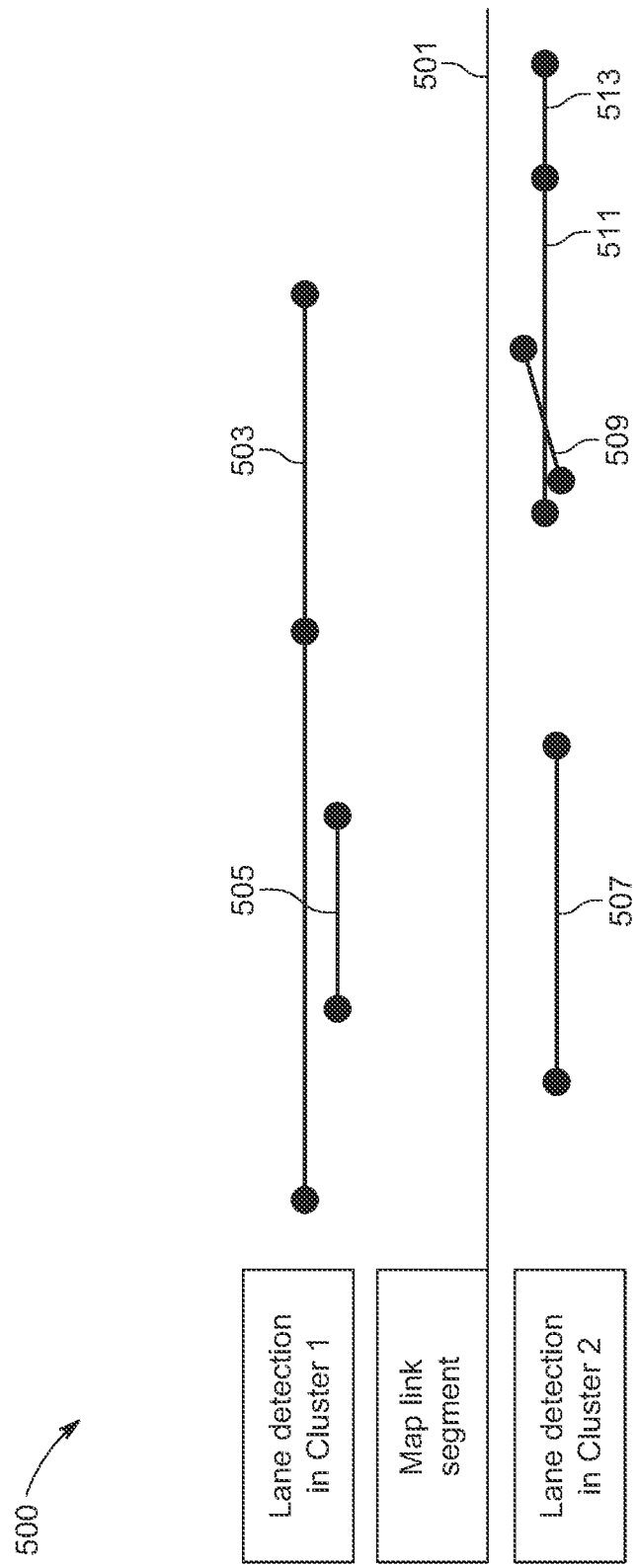
Figure 6A:
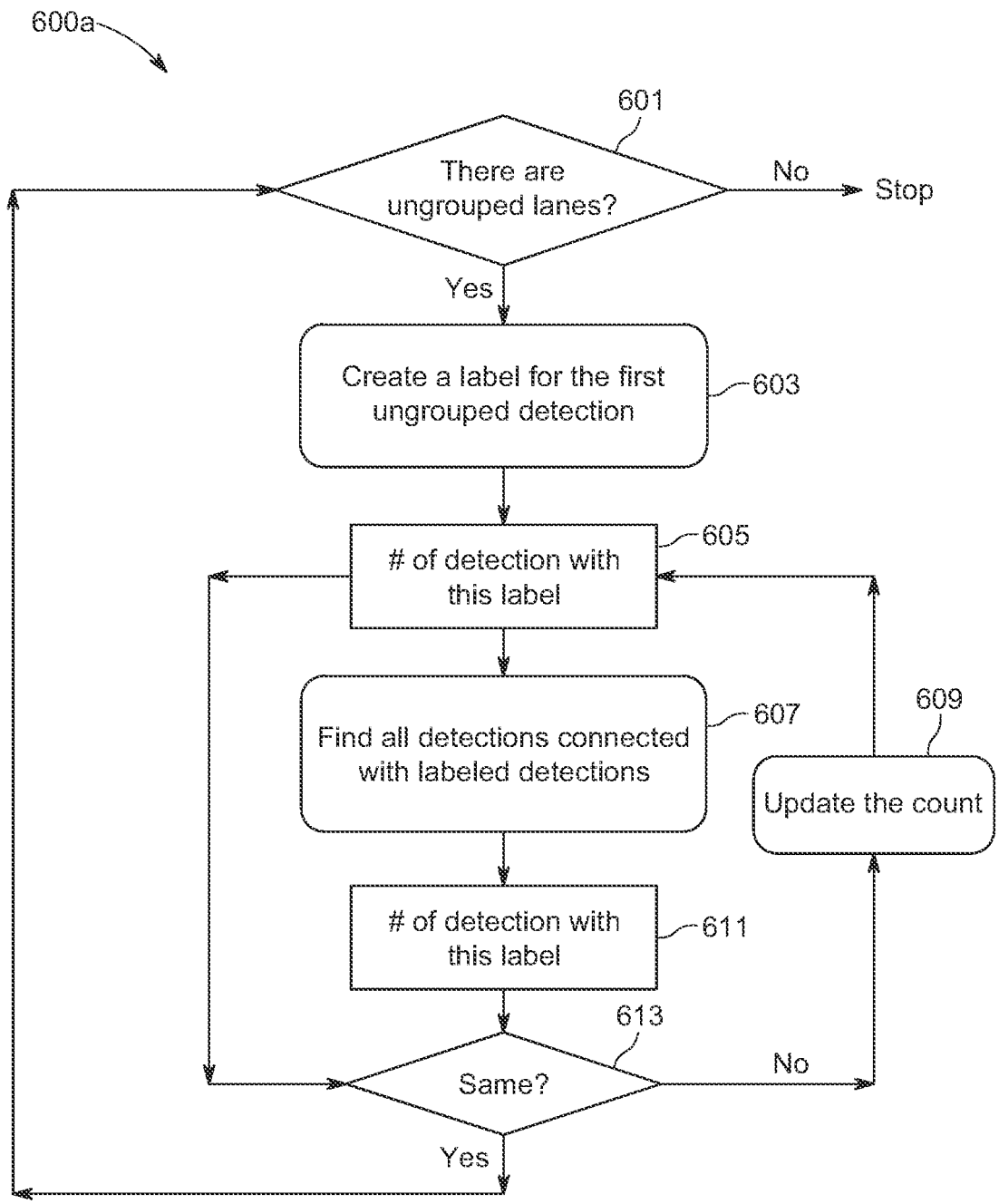
Figure 6B:
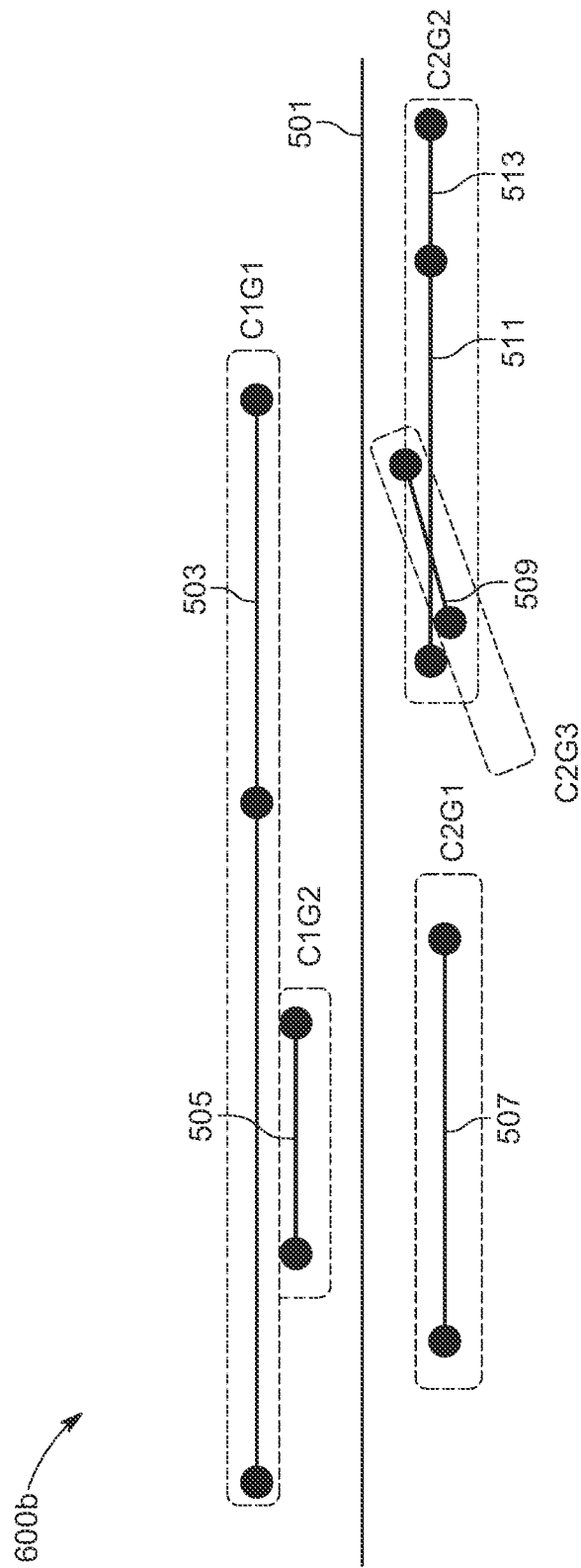
Figure 7:
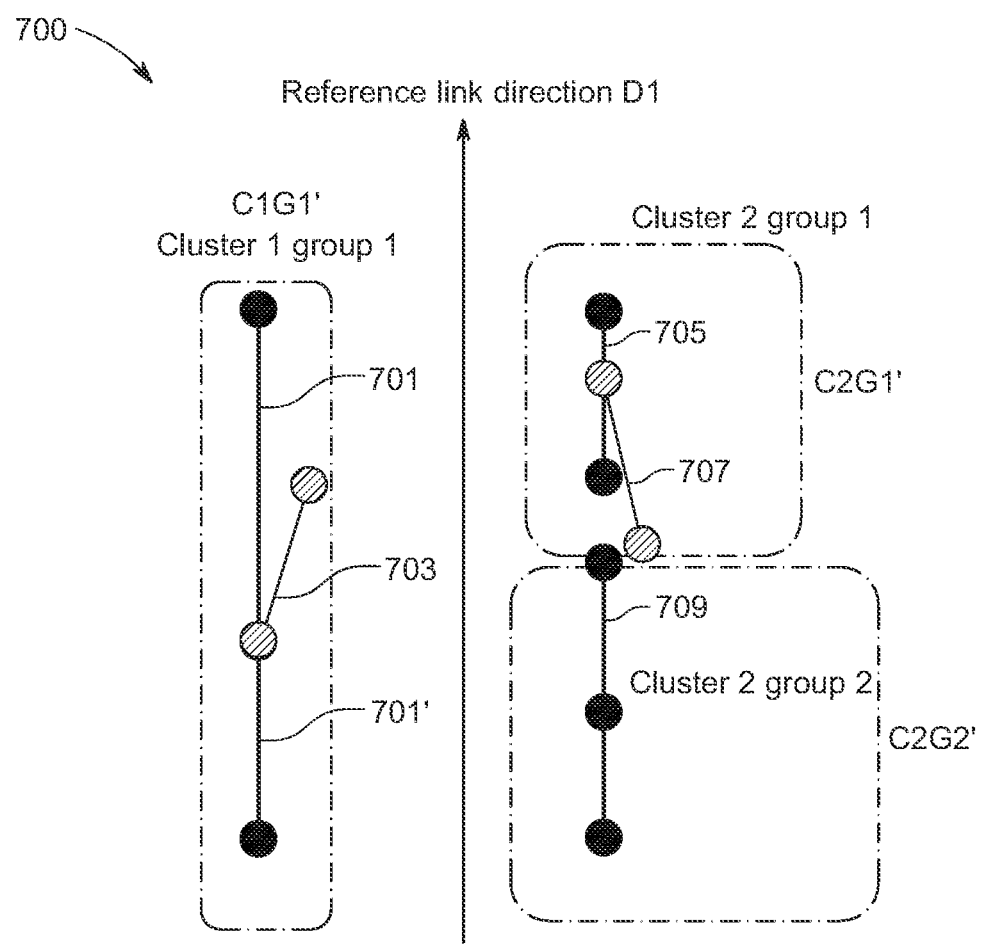
Figure 8:
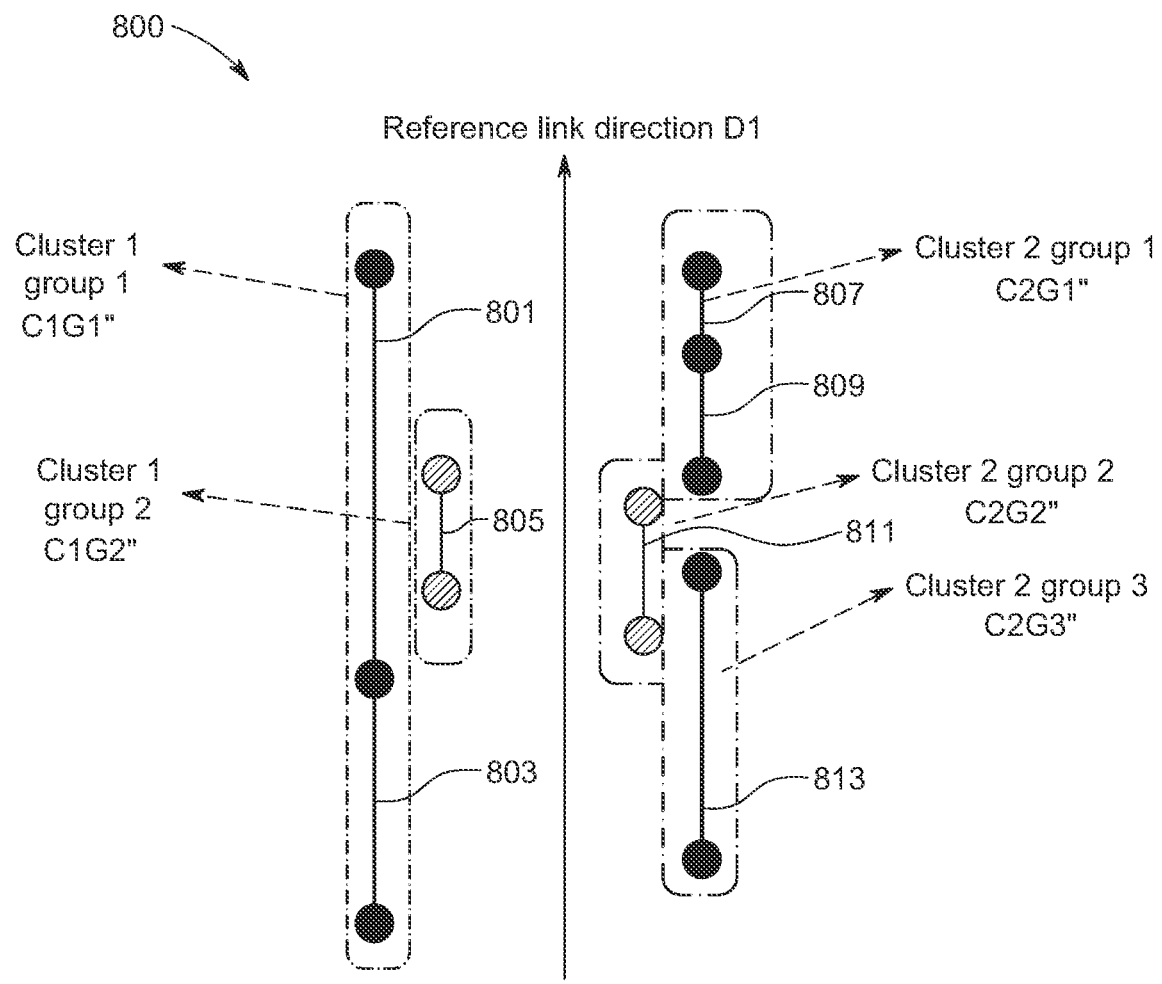
Figure 9:
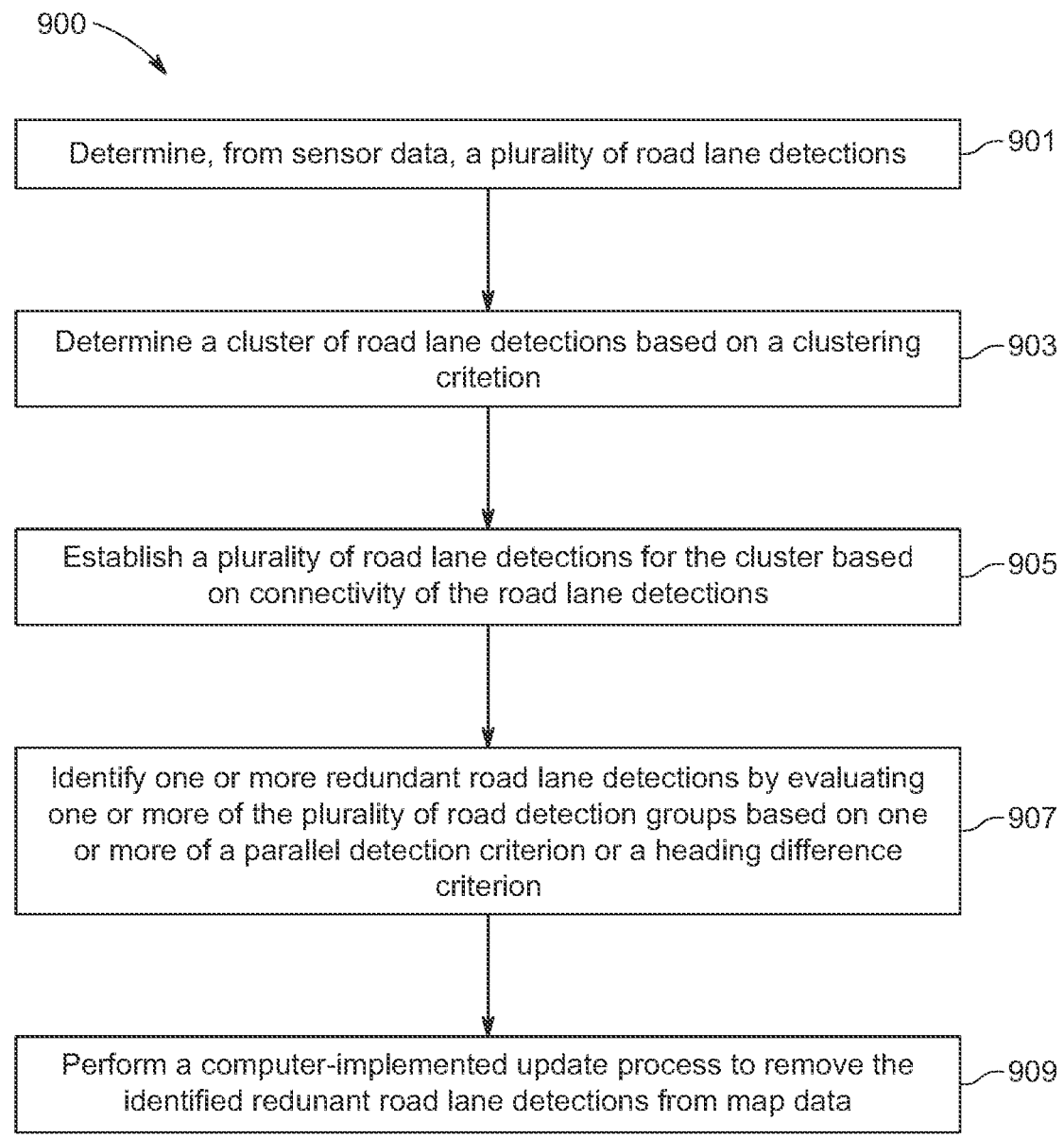
Figure 10:
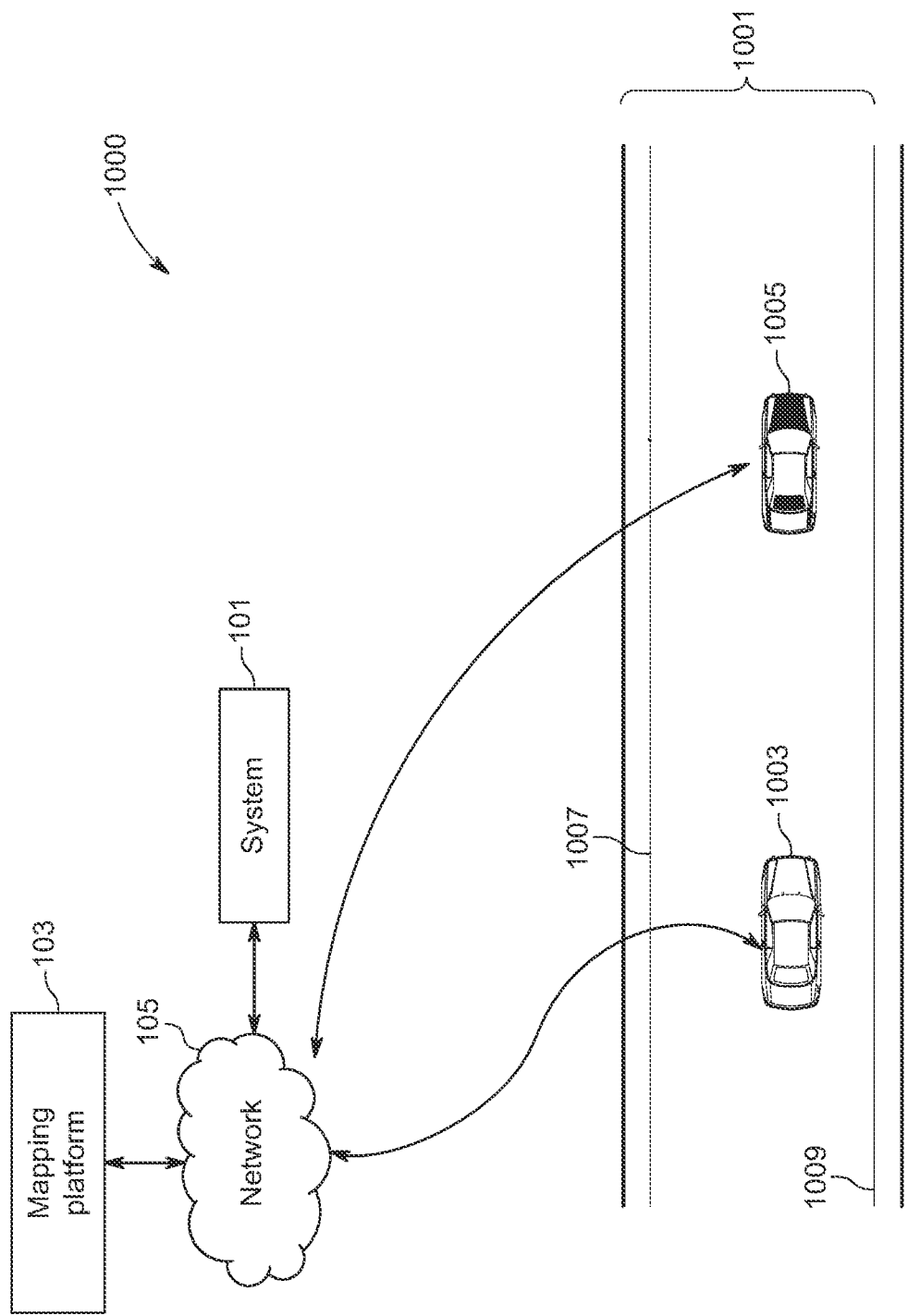

Having thus described example embodiments of the invention in general terms, reference will now be made to the accompanying drawings, which are not necessarily drawn to scale, and wherein:

FIG. 1A illustrates a block diagram showing a network environment of a system for identifying redundant road lane detections, in accordance with one or more example embodiments;

FIG. 1B illustrates a block diagram showing map data, in accordance with one or more example embodiments;

FIG. 1C illustrates another block diagram showing map data, in accordance with one or more example embodiments;

FIG. 1D illustrates yet another block diagram showing map data, in accordance with one or more example embodiments;

FIG. 2 illustrates a block diagram of the system for identifying redundant road lane detections and updating map data, in accordance with one or more example embodiment;

FIG. 3 illustrates a Graphical User Interface (GUI) depicting road lane detection data before identifying redundant road lane detections by the system of FIG. 1, in accordance with one or more example embodiments;

FIG. 4 illustrates a high-level block diagram of a method for identifying redundant road lane detections, in accordance with one or more example embodiments;

FIG. 5 illustrates a high-level block diagram of determination of clusters for road lane detections, in accordance with one or more example embodiments;

FIG. 6A illustrates a flow diagram of a method for establishing a plurality of groups for road lane detections, in accordance with one or more example embodiments;

FIG. 6B illustrates a diagrammatic representation of a working example of a method for establishing a plurality of groups for road lane detections, in accordance with one or more example embodiments FIG. 7 illustrates a diagrammatic representation of a working example for identification of redundant road lane detections based on a heading difference criterion, in accordance with one or more example embodiments;

FIG. 8 illustrates a diagrammatic representation of a working example for identification of redundant road lane detections based on a parallel length criterion, in accordance with one or more example embodiments;

FIG. 9 illustrates a flow diagram of a method for identifying redundant road lane detections and updating map data, in accordance with one or more example embodiments; and FIG. 10 illustrates a working environment of the system and the method for identification of redundant road lane detections and updating of map data, in accordance with one or more example embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses, systems, and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

A system, a method, and a computer program product are provided for identifying redundant road lane detections. After identification, the redundant road lane detections are removed from map data in order to improve the quality and accuracy of map data. The road lane detections are associated with lame marking detections by sensors of one or more vehicles. Each of these vehicles may be at least one of a type of a probe vehicle or a ground truth collection vehicle. The vehicle may be travelling on a road, a road segment, a link, or a link segmented, which are represented by map data, such on a high-definition fast map associated with a mapping and navigation service. The identification and removal of redundant road lane detections may be performed independently for each link or link segment.

The methods and systems provided herein include determination of a plurality of road lane detections based on sensor data collected by one or more sensors of the vehicles. The plurality of road lane detections are used to form clusters of road lane detections based on a clustering criterion, such as a matched distance criterion. Further, for each cluster, a plurality of road lane detection groups are established based on connectivity of the road lane detections in each cluster. These groups are then evaluated to identify redundant road lane detections based on parallel detections and heading difference identification criterion. For example, if two road lane detection groups are parallel, the shorter length group may be identified as the redundant one. Similarly, if a road lane detection has a heading difference greater than a heading difference threshold, those road lane detection may belong to diagonal links and thus may be redundant road lane detections. The redundant road lane detections thus identified are removed from the map data and subsequently the map data is updated to reflect these removals, thereby providing accurate and reliable map data for guided navigation services. The systems and methods that accomplish the objectives described above will now be described in conjunction with various figures.

FIG. 1A illustrates a block diagram 100a showing a network environment of a system 101 for identifying redundant road lane detections, in accordance with one or more example embodiments. The system 101 may be communicatively coupled, via a network 105, to one or more of a mapping platform 103, a user equipment 107a, a user equipment 107b, and/or an OEM (Original Equipment Manufacturer) cloud 109. The OEM cloud 109 may be connected to the user equipment 107b. The components described in the block diagram 100a may be further broken down into more than one component such as one or more sensors or application in user equipment and/or combined together in any suitable arrangement. Further, it is possible that one or more components may be rearranged, changed, added, and/or removed without deviating from the scope of the present disclosure.

In an example embodiment, the system 101 may be embodied in one or more of several ways as per the required implementation. For example, the system 101 may be embodied as a cloud-based service, a cloud-based application, a cloud-based platform, a remote server-based service, a remote server-based application, a remote server-based platform, or a virtual computing system. As such, the system 101 may be configured to operate inside the mapping platform 103 and/or inside at least one of the user equipment 107a and the user equipment 107b.

In some embodiments, the system 101 may be embodied within one or both of the user equipment 107a and the user equipment 107b, for example as a part of an in-vehicle navigation system, a navigation app in a mobile device and the like. In each of such embodiments, the system 101 may be communicatively coupled to the components shown in FIG. 1A to carry out the desired operations and wherever required modifications may be possible within the scope of the present disclosure. The system 101 may be implemented in a vehicle, where the vehicle may be an autonomous vehicle, a semi-autonomous vehicle, or a manually driven vehicle. In an embodiment, the system 101 may be deployed in a consumer vehicle or a probe vehicle, and/or a ground truth collection vehicle to collect sensor data for specifically updating the road lane detection data associated the mapping platform 103.

In some other embodiments, the system 101 may be a server 103b of the mapping platform 103 and therefore may be co-located with or within the mapping platform 103. In yet some other embodiments, the system 101 may be implemented within an OEM (Original Equipment Manufacturer) cloud, such as the OEM cloud 109. The OEM cloud 109 may be configured to anonymize any data received from the system 101, such as the vehicle, before using the data for further processing, such as before sending the data to the mapping platform 103. In some embodiments, anonymization of data may be done by the mapping platform 103. Further, in some example embodiments, the system 101 may be a standalone unit configured to update the road lane detection data for an autonomous vehicle. Additionally, the system 101 may be coupled with an external device such as the autonomous vehicle.

The mapping platform 103 may comprise a map database 103a (also referred to as geographic database 103a) for storing map data and a processing server 103b for carrying out the processing functions associated with the mapping platform 103. The map database 103a may store node data, road segment data or link data, point of interest (POI) data, road obstacles related data, traffic objects related data, posted signs related data, such as road sign data, lane marking data such as road lane detection data or the like. The map database 103a may also include cartographic data and/or routing data. According to some example embodiments, the link data may be stored in link data records, where the link data may represent links or segments representing roads, streets, or paths, as may be used in calculating a route or recorded route information for determination of one or more personalized routes. The node data may be stored in node data records, where the node data may represent end points corresponding to the respective links or segments of the road segment data. One node represents a point at one end of the respective link and the other node represents a point at the other end of the respective link. The node at either end of a link corresponds to a location at which the road meets another road, e.g., an intersection, or where the road dead ends. An intersection may not necessarily be a place at which a turn from one road to another is permitted but represents a location at which one road and another road have the same latitude, longitude, and elevation. In some cases, a node may be located along a portion of a road between adjacent intersections, e.g., to indicate a change in road attributes, a railroad crossing, or for some other reason. (The terms "node" and "link" represent only one terminology for describing these physical geographic features and other terminology for these features is intended to be encompassed within the scope of these concepts.) The link data and the node data may represent a road network used by vehicles such as cars, trucks, buses, motorcycles, and/or other entities.

Additionally, the map database 103a may contain path segment and node data records, or other data that may represent pedestrian paths or areas in addition to or instead of the vehicle road record data, for example. The links/road segments and nodes may be associated with attributes, such as geographic coordinates and other navigation related attributes, as well as POIs, such as fueling stations, hotels, restaurants, museums, stadiums, offices, auto repair shops, buildings, stores, parks, etc. The navigation related attributes may include one or more of travel speed data (e.g. data indicative of a permitted speed of travel) on the road represented by the link data record, a travel direction data (e.g. data indicative of a permitted direction of travel) on the road represented by the link data record, the linear feature data on the road represented by the link data record, the road lane detection data on the road represented by the link data record, street address ranges of the road represented by the link data record, the name of the road represented by the link data record, and the like.

As used herein, the 'road lane detection data' may be data indicative of lane markings on the link or the road or may be related to any linear feature along the road represented by the link data record. The linear feature may be at least one of lane markings, road curbs, guardrails, road medians, road barriers, and the like along the road. The lane markings may be of an alternate color in contrast to the color of surface of the road. In some example embodiments, lane markings are yellow in color, such as when they are used to indicate roadwork zones. The road lane detection data may be captured by an image capturing device, such as a camera, installed in the vehicle traversing the link to generate a road lane detection. The vehicle may also include one or more other sensors as well for generating the road lane detections. The sensors in the vehicle may transmit the generated lane marking observations to the OEM cloud 109 sequentially.

These road lane detections are used further to update map data of the map database 103a. The map database 103a also stores various navigation related attributes associated with a link that may be stored in a single data record or may be stored in more than one type of record.

Each link data record that represents other-than-straight link (for example, a curved link) may include shape location data. A shape location is a location along a link between its endpoints. For instance, to represent the shape of other-than-straight roads/links, a geographic database developer may select one or more shape locations along the link portion. The shape location data included in the link data record may indicate a position, (e.g., latitude, longitude, and optionally, altitude or elevation) of the selected shape point(s) along the represented link.

Additionally, the map database 103a may also include data about the POIs and their respective locations in the POI records. The map database 103a may further include data about places, such as cities, towns, or other communities, and other geographic features such as bodies of water, mountain ranges, etc. Such place or feature data may be part of the POI data or may be associated with POIs or POI data records (such as a data point used for displaying a city). In addition, the map database 103a may include event data (e.g., traffic incidents, construction activities, scheduled events, unscheduled events, etc.) associated with the POI data records or other records of the map database 103a.

The map database 103a may be maintained by a content provider e.g., a map developer. By way of example, the map developer may collect the map data to generate and enhance the map database 103a. There may be different ways used by the map developer to collect data. These ways may include obtaining data from other sources, such as municipalities or respective geographic authorities. In addition, the map developer may employ field personnel to travel by vehicle (also referred to as a dedicated vehicle) along roads throughout a geographic region to observe features and/or record information about them, for example. Also, remote sensing, such as aerial or satellite photography, may be used to collect the map data. In some example embodiments, the map data in the map database 103a may be stored as a digital map. The digital map may correspond to satellite raster imagery, bitmap imagery, or the like. The satellite raster imagery/bitmap imagery may include map features (such as link/road segments, nodes, and the like) and the navigation related attributes associated with the map features. In some embodiments, the map features may have a vector representation form. Additionally, the satellite raster imagery may include three-dimensional (3D) map data that corresponds to 3D map features, which are defined as vectors, voxels, or the like.

According to some embodiments, the map database 103a may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, the map data may be compiled (such as into a platform specification format (PSF format)) to organize and/or configure the data for performing navigation-related functions and/or services, such as route calculation, route guidance, map display, speed calculation, distance and travel time functions, navigation instruction generation and other functions, by a navigation device, such as by the user equipment 107a and/or 107b. The navigation-related functions may correspond to vehicle navigation, pedestrian navigation, navigation instruction suppression, navigation instruction generation based on user preference data or other types of navigation. The compilation to produce the end user databases may be performed by a party or entity separate from a map developer. For example, a customer of the map developer, such as a navigation device developer or other end user device developer, a navigation app service provider and the like may perform compilation on a received map database in a delivery format to produce one or more compiled navigation databases.

As mentioned above, the map database 103a may be a master geographic database, but in alternate embodiments, the map database 103a may be embodied as a client-side map database and may represent a compiled navigation database that may be used in or with end user equipment such as the user equipment 107a and/or the user equipment 107b to provide navigation and/or map-related functions. For example, the map database 103a may be used with the user equipment 107a and/or the user equipment 107b to provide an end user with navigation features. In such a case, the map database 103a may be downloaded or stored locally (cached) on the user equipment 107a and/or the user equipment 107b.

The processing server 103b may comprise processing means, and communication means. For example, the processing means may comprise one or more processors configured to process requests received from the user equipment 107a and/or the user equipment 107b. The processing means may fetch map data from the map database 103a and transmit the same to the user equipment 107b via the OEM cloud 109 in a format suitable for use by the one or both of the user equipment 107a and/or the user equipment 107b. In one or more example embodiments, the mapping platform 103 may periodically communicate with the user equipment 107a and/or the user equipment 107b via the processing server 103b to update a local cache of the map data stored on the user equipment 107a and/or the user equipment 107b. Accordingly, in some example embodiments, the map data may also be stored on the user equipment 107a and/or the user equipment 107b and may be updated based on periodic communication with the mapping platform 103 via the network 105.

The network 105 may be wired, wireless, or any combination of wired and wireless communication networks, such as cellular, Wi-Fi, internet, local area networks, or the like. In one embodiment, the network 105 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof.

In some example embodiments, the user equipment 107a and the user equipment 107b may be any user accessible device such as a mobile phone, a smartphone, a portable computer, and the like that are portable in themselves or as a part of another portable/mobile object such as a vehicle. The user equipment 107a and 107b may comprise a processor, a memory, and a communication interface. The processor, the memory, and the communication interface may be communicatively coupled to each other. In some example embodiments, the user equipment 107a and 107b may be associated, coupled, or otherwise integrated with a vehicle, such as an advanced driver assistance system (ADAS), a personal navigation device (PND), a portable navigation device, an infotainment system and/or other device that may be configured to provide route guidance and navigation related functions to the user. In such example embodiments, the user equipment 107a and 107b may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 107a and 107b. For example, the user equipment 107a and 107b may be configured to execute and run mobile applications such as a messaging application, a browser application, a navigation application, and the like.

In one embodiment, at least one user equipment such as the user equipment 107a may be directly coupled to the system 101 via the network 105. For example, the user equipment 107a may be a dedicated vehicle (or a part thereof) for gathering data for development of the map data stored in the map database 103a. In another embodiment, at least one user equipment such as the user equipment 107b may be coupled to the system 101 via the OEM cloud 109 and the network 105. For example, the user equipment 107b may be a consumer vehicle (or a part thereof) and may be a beneficiary of the services provided by the system 101. In some example embodiments, one or more of the user equipment 107a and 107b may serve the dual purpose of a data gatherer and a beneficiary device. At least one of the user equipment 107a and 107b may be configured to capture sensor data associated with the link/road segment, while traversing along the link/road segment. For example, the sensor data may include image data associated with road lane detections along the link/road segment, among other things. The sensor data may be collected from one or more sensors in the user equipment 107a and/or user equipment 107b. As disclosed in conjunction with various embodiments disclosed herein, the system 101 may update the linear feature data using the sensor data.

FIG. 1B shows format of the map data 100b stored in the map database 103a according to one or more example embodiments. FIG. 1B shows a link data record 111 that may be used to store data about one or more of the road links. This link data record 111 has information (such as "attributes", "fields", etc.) associated with it that allows identification of the nodes associated with the road link and/or the geographic positions (e.g., the latitude and longitude coordinates and/or altitude or elevation) of the two nodes. In addition, the link data record 111 may have information (e.g., more "attributes", "fields", etc.) associated with it that specify the permitted speed of travel on the portion of the road represented by the link data record 111, the direction of travel permitted on the road portion represented by the link data record 111, what, if any, turn restrictions exist at each of the nodes which correspond to intersections at the ends of the road portion represented by the link record, the street address ranges of the roadway portion represented by the link record, the name of the road, and so on. The various attributes associated with a link may be included in a single data record or are included in more than one type of record which are referenced to each other.

Each link data record that represents another-than-straight road segment may include shape point data. A shape point is a location along a link between its endpoints. To represent the shape of other-than-straight roads, the mapping platform 103 and its associated map database developer selects one or more shape points along the other-than-straight road portion. Shape point data included in the link data record 111 indicate the position, (e.g., latitude, longitude, and optionally, altitude or elevation) of the selected shape points along the represented road link.

Additionally, in the compiled geographic database, such as a copy of the map database 103a that is compiled and provided to the user, there may also be a node data record 113 for each node. The node data record 113 may have associated with it information (such as "attributes", "fields", etc.) that allows identification of the link(s) that connect to it and/or its geographic position (e.g., its latitude, longitude, and optionally altitude or elevation).

In some embodiments, compiled geographic databases are organized to facilitate the performance of various navigation-related functions. One way to facilitate performance of navigation-related functions is to provide separate collections or subsets of the geographic data for use by specific navigation-related functions. Each such separate collection includes the data and attributes needed for performing the particular associated function but excludes data and attributes that are not needed for performing the function. Thus, the map data may be alternately stored in a format suitable for performing types of navigation functions, and further may be provided on-demand, depending on the type of navigation function.

FIG. 1C shows another format of the map data 100c stored in the map database 103a according to one or more example embodiments. In the FIG. 1C, the map data 100c is stored by specifying a road segment data record 115. The road segment data record 115 is configured to represent data that represents a road network. In FIG. 1C, the map database 103a contains at least one road segment data record 115 (also referred to as "entity" or "entry") for each road segment in a geographic region.

The map database 103a that represents the geographic region also includes a database record 117 (a node data record 117a and a node data record 117b) (or "entity" or "entry") for each node associated with the at least one road segment shown by the road segment data record 115. (The terms "nodes" and "segments" represent only one terminology for describing these physical geographic features and other terminology for describing these features is intended to be encompassed within the scope of these concepts). Each of the node data records 117a and 117b may have associated information (such as "attributes", "fields", etc.) that allows identification of the road segment(s) that connect to it and/or its geographic position (e.g., its latitude and longitude coordinates).

FIG. 1C shows some of the components of the road segment data record 115 contained in the map database 103a. The road segment data record 115 includes a segment ID 115a by which the data record can be identified in the map database 103a. Each road segment data record 115 has associated with it information (such as "attributes", "fields", etc.) that describes features of the represented road segment. The road segment data record 115 may include data 115b that indicate the restrictions, if any, on the direction of vehicular travel permitted on the represented road segment. The road segment data record 115 includes data 115c that indicate a static speed limit or speed category (i.e., a range indicating maximum permitted vehicular speed of travel) on the represented road segment. The static speed limit is a term used for speed limits with a permanent character, even if they are variable in a pre-determined way, such as dependent on the time of the day or weather. The static speed limit is the sign posted explicit speed limit for the road segment, or the non-sign posted implicit general speed limit based on legislation.

The road segment data record 115 may also include data 115d indicating the two-dimensional ("2D") geometry or shape of the road segment. If a road segment is straight, its shape can be represented by identifying its endpoints or nodes. However, if a road segment is other-than-straight, additional information is required to indicate the shape of the road. One way to represent the shape of an other-than-straight road segment is to use shape points. Shape points are points through which a road segment passes between its end points. By providing the latitude and longitude coordinates of one or more shape points, the shape of an other-than-straight road segment can be represented. Another way of representing other-than-straight road segment is with mathematical expressions, such as polynomial splines.

The road segment data record 115 also includes road grade data 115e that indicate the grade or slope of the road segment. In one embodiment, the road grade data 115e include road grade change points and a corresponding percentage of grade change. Additionally, the road grade data 115e may include the corresponding percentage of grade change for both directions of a bi-directional road segment. The location of the road grade change point is represented as a position along the road segment, such as thirty feet from the end or node of the road segment. For example, the road segment may have an initial road grade associated with its beginning node. The road grade change point indicates the position on the road segment wherein the road grade or slope changes, and percentage of grade change indicates a percentage increase or decrease of the grade or slope. Each road segment may have several grade change points depending on the geometry of the road segment. In another embodiment, the road grade data 115e includes the road grade change points and an actual road grade value for the portion of the road segment after the road grade change point until the next road grade change point or end node. In a further embodiment, the road grade data 115e includes elevation data at the road grade change points and nodes. In an alternative embodiment, the road grade data 115e is an elevation model which may be used to determine the slope of the road segment.

The road segment data record 115 also includes data 115g providing the geographic coordinates (e.g., the latitude and longitude) of the end points of the represented road segment. In one embodiment, the data 115g are references to the node data records 115 that represent the nodes corresponding to the end points of the represented road segment.

The road segment data record 115 may also include or be associated with other data 115f that refer to various other attributes of the represented road segment. The various attributes associated with a road segment may be included in a single road segment record or may be included in more than one type of record which cross-reference each other. For example, the road segment data record 115 may include data identifying the name or names by which the represented road segment is known, the street address ranges along the represented road segment, and so on.

FIG. 1C also shows some of the components of the node data record 117 contained in the map database 103a. Each of the node data records 117 may have associated information (such as "attributes", "fields", etc.) that allows identification of the road segment(s) that connect to it and/or it's geographic position (e.g., its latitude and longitude coordinates). For the embodiment shown in FIG. 1C, the node data records 117a and 117b include the latitude and longitude coordinates 117a1 and 117b1 for their nodes. The node data records 117a and 117b may also include other data 117a2 and 117b2 that refer to various other attributes of the nodes. In some embodiments, the node data records 117a and 117b may be associated with at least one first point and at least one second point, which may be border points of a road lane detection associated with the road link line to be generated.

Thus, the overall data stored in the map database 103a may be organized in the form of different layers for greater detail, clarity, and precision. Specifically, in the case of high-definition maps, the map data may be organized, stored, sorted, and accessed in the form of three or more layers. These layers may include road level layer, lane level layer and localization layer. The data stored in the map database 103a in the formats shown in FIGS. 1B and 1C may be combined in a suitable manner to provide these three or more layers of information. In some embodiments, there may be lesser or fewer number of layers of data also possible, without deviating from the scope of the present disclosure.

FIG. 1D illustrates a block diagram 100d of the map database 103a storing map data or geographic data 123 in the form of road segments/links, nodes, and one or more associated attributes as discussed above. Furthermore, attributes may refer to features or data layers associated with the link-node database, such as an HD lane data layer.

In addition, the map data 123 may also include other kinds of data 119. The other kinds of data 119 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. The map database 103a also includes indexes 121. The indexes 121 may include various types of indexes that relate the different types of data to each other or that relate to other aspects of the data contained in the geographic database 103a.

The data stored in the map database 103a in the various formats discussed above may help in provide precise data for high-definition mapping applications, autonomous vehicle navigation and guidance, cruise control using ADAS, direction control using accurate vehicle maneuvering and other such services. In some embodiments, the system 101 accesses the map database 103a storing data in the form of various layers and formats depicted in FIGS. 1B-1D, to provide accurate road lane detection data.

FIG. 2 illustrates a block diagram 200 of the system 101 for identifying redundant road lane detections, in accordance with one or more example embodiment. The system 101 may include at least one processor 201, a memory 203, and a communication interface 205. Further, the system 101 may comprise a reception module 201a, a clustering module 201b, a grouping module 201c, a redundant lane detection identification module 201d, and an updating module 201e.

In an embodiment, the reception module 201a may be configured to obtain the sensor data associated with road lane detections. The sensor data may be obtained from one or more user equipment, such as the user equipment 107a, the user equipment 107b and the like. The sensor data may also be obtained from the one or more user equipment installed in a vehicle (such as the consumer or "probe" vehicle; or the dedicated data collection vehicle discussed briefly earlier). The vehicle may be equipped with one or more sensors such as a camera, an acceleration sensor, a gyroscopic sensor, a LIDAR sensor, a proximity sensor, a motion sensor, and the like. The sensors may primarily be used for detecting road lane data, also interchangeably referred to as road lane detections, and determining positioning of the vehicle and the sensors may be built-in or embedded into or within interior of the user equipment associated with the vehicle. In some embodiments, the user equipment 107a or 107b uses communication signals for position determination of the vehicle. The user equipment 107a or 107b may receive location data from a positioning system, a Global Navigation Satellite System, such as Global Positioning System (GPS), Galileo, GLONASS, BeiDou, etc., cellular tower location methods, access point communication fingerprinting such as Wi-Fi or Bluetooth based radio maps, or the like. The data collected by the sensors in the vehicle may be used to gather information related to an environment of the vehicle, such as, the road lane detection data, the distance of the vehicle from the road lane boundary or lane marking, the lateral placement of the vehicle on the road link, and the like. In some embodiments, the sensors positioned on or within and the user equipment 107a or 107b may provide data indicating a location of the vehicle and a heading data value associated with the vehicle, a road lane detection heading value associated with the road lane detection, and the like. The data collected by the sensors may be transmitted to the OEM cloud 109. Vehicle or sensor data may be collected by any device capable of determining the necessary information and providing the necessary information to a remote entity. The user equipment 107a or 107b is one example of a device that may function as a probe to collect probe data of the vehicle. The data captured by the sensors from one or more vehicles, as obtained by the reception module 201a may have several inaccuracies and redundancies due to some of the reasons described earlier, and thus, may be sent for refinement and processing to other modules of the processor 201.

The reception module 201a may obtain a plurality of road lane detections associated with each road link represented by map data of the map database 103a. Each road link corresponds to the link/road segment for which road data is already stored in the map database 103a. Each road link may be associated with a plurality of road lane detections, which are obtained by any of (i) one or more road lane detections captured by a single vehicle at different locations on the road link and at different time instances, (ii) one or more road lane detections captured by multiple vehicles for the same location or nearly same location, or (iii) one or more road lane detections captured by multiple vehicles for different locations at different time instances. The clustering module 201b may be configured to determine a cluster associated with the road link according to a clustering criterion. The cluster may be generated by sequentially clustering the plurality of road lane detections by any known clustering algorithms such as K-means clustering, DB SCAN, mean-shift clustering and the like. As a result of the clustering algorithm, at least some of the road lane detections are clustered together, based on their satisfaction of the clustering criterion.

In some embodiments, the clustering criterion includes identifying a matched distance for each road lane detection. The matched distance relates to a distance of separation of the road lane detection from the road link. The road link may be represented in the map data as a link line segment (directed or undirected). The road link may be identified from the map data by map-matching of a vehicle's location at the time of capturing an observation related to the road lane detection. The road lane detection may be represented by a point or by a lane line segment (connecting two or more points), which has associated location coordinates, and lateral position. The exact location of the road lane detection may be identified on the basis of either image data analysis or by map data or a combination thereof. Thus, the matched distance may represent a distance of separation between the road link, as represented by the link line segment, and the road lane detection, as represented by the point or the lane line segment. The matched distance may be a Euclidean distance representing the distance of separation between the road link and the road lane detection. The matched distance may be identified for each road lane detection in the plurality of road lane detections obtained by the sensors in the reception module 210a.

Further, the clustering module 201b may be configured to sequentially cluster the road lane detections with same matched distance into a single cluster. The term same matched distance may be used to mean either of: (i) exactly equal matched distance, or (ii) matched distance difference of two road lane detections being equal to or lesser than a matched distance threshold. Thus, as a result of the operation of the clustering module 201b, one or more clusters of road lane detections based on matched distance criterion may be determined. This will be further explained in the description of FIG. 5.

Returning to FIG. 2, the grouping module 201c may be configured to operate on each cluster determined by the clustering module 201b, and further, to establish a plurality of road lane detection groups for each cluster. The one or more road lane detection groups may be established by performing one or more operations comprising (i) respectively grouping any road lane detections of the cluster that are connected with one another, or (ii) establishing a given road lane detection group respectively for each unconnected road lane detection of the cluster. The road lane detections may be connected to one other such as when an end point of a first road lane detection is connected to a starting point of a second road lane detection. This may also be construed as having the border points of two road lane detections overlap, so as to form an overlapping connecting point, and to form a continuous road lane detection. The continuous road lane detection is thus a combination of the two individual road lane detections that join at the overlapping border point. It may be noted that for the purposes of explanation in this disclosure, two road lane detections that intersect with one another at a point other than an overlapping border point may not be considered to be connected to each other. This intersection of the road lane detection at a point other than the overlapping border point may be due to a crossed road lane detection or a road lane detection captured due to changing of lane by a vehicle capturing the road lane detections and is generally classified into a separate road lane detection group than the road lane detection group of the road lane detection that it intersects. This will be explained further in conjunction with the description of FIG. 6A-6B.

Referring back to FIG. 2, after the establishment of the plurality of road lane detection groups by the grouping module 201c, the redundant lane detection identification module 201d may be configured to evaluate one or more of these road lane detection groups, such as sequentially, according to a parallel detection criterion and a heading detection criterion. This evaluation may then lead to identification of one or more redundant road lane detections.

For example, the parallel-detection criterion may include identifying at least two road lane detection groups in the plurality of road lane detection groups that are parallel to each other. Further, respective length associated with each of the at least two road lane detection groups is identified. Thereafter, one or more redundant road lane detections based on the respective lengths of the groups identified. In some embodiments, a road lane detection group with shorter respective length may be identified as the one or more redundant road lane detections. However, in some other embodiments, the road lane detection group with longer respective length may be identified as the one or more redundant road lane detections.

Further, in some embodiments, the heading difference criterion includes determining a road lane detection heading value for each road lane detection in a road lane detection group. Further, determining a group heading value for each road lane detection group. The group heading value may be such as, an average or a median value of all the road lane detection heading values corresponding to all the road lane detections in the group. The road lane detection heading value in turn may be obtained based on map data. Further, a heading difference value between the road lane detection heading value of each road lane detection and the group heading value may be calculated. This heading difference value may then be compared with a predetermined heading difference value threshold. The road lane detections for which the corresponding heading difference value is more than the predetermined heading difference value threshold, are then detected as the redundant road lane detections.

In some embodiments, apart from the parallel detection criterion and the heading difference criterion, a lateral position criterion associated with lateral placement of each road lane detection on the road link may also be evaluated to identify redundant road lane detections.

Once the redundant road lane detections have been identified by the redundant lane detection identification module 201d, the updating module 201e may be configured to interface with the map database 103a to perform a computer-implemented update process to remove the identified one or more redundant road lane detections from the map data stored in the map database 103a. Thus, the update may lead to increasing the overall quality and reliability of the map data. When this superior quality map data is further used to generate one or more navigation instructions as part of some navigation applications associated with navigation of autonomous or semi-autonomous vehicles, the overall safety and reliability of such navigation applications is much higher as compared to existing navigation applications known in the art.

According to an embodiment, each of the modules 201a-201e may be embodied in the processor 201. The processor 201 may retrieve computer-executable instructions that may be stored in the memory 203 for execution of the computer-executable instructions, which when executed configure the processor 201 for updating the linear feature data.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally or alternatively, the processor 201 may include one or more processors configured in tandem via the bus to enable independent execution of instructions, pipelining and/or multithreading.

Additionally or alternatively, the processor 201 may include one or more processors capable of processing large volumes of workloads and operations to provide support for big data analysis. In an example embodiment, the processor 201 may be in communication with the memory 203 via a bus for passing information to mapping platform 103. The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the system 101 to carry out various functions in accordance with an example embodiment of the present disclosure. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present disclosure while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

In some embodiments, the processor 201 may be configured to provide Internet-of-Things (IoT) related capabilities to a user of the system 101, where the user may be a traveler, a driver of the vehicle and the like. In some embodiments, the user may be or correspond to an autonomous or semi-autonomous vehicle. The IoT related capabilities may in turn be used to provide smart navigation solutions by providing real time updates to the user to take pro-active decision on lane maintenance, speed determination, lane-level speed determination, turn-maneuvers, lane changes, overtaking, merging and the like. The system 101 may be accessed using the communication interface 205. The communication interface 205 may provide an interface for accessing various features and data stored in the system 101. For example, the communication interface 205 may comprise I/O interface which may be in the form of a GUI, a touch interface, a voice enabled interface, a keypad, and the like. For example, the communication interface 205 may be a touch enabled interface of a navigation device installed in a vehicle, which may also display various navigation related data to the user of the vehicle. Such navigation related data may include information about upcoming conditions on a route, route display and alerts about lane maintenance, turn-maneuvers, vehicle speed, and the like.

The various modules 210a-201e of the processor 201, in conjunction with the memory 203 and communication 205 may provide capabilities and advantages to the system 101 to produce high quality sensor data for reliable and secure navigation applications, which was not possible with existing solutions known in the art. Some of these advantages are possible due to removal of redundant road lane detection data, which otherwise poses many safety and reliability related challenges while navigation, specifically in autonomous vehicles or vehicles based on high-definition fast maps. For example, some of these challenges are depicted in FIG. 3.

FIG. 3 illustrates a GUI 300 depicting road lane detection data before identifying redundant road lane detections by the system of FIG. 1, in accordance with one or more example embodiments.

The GUI 300 may be implemented by the user equipment 107a and/or the user equipment 107b. The GUI 300 includes a map data display 301 depicting a map of an area of interest, such as a route on which the vehicle associated with the user equipment 107a and/or the user equipment 107b is travelling. In absence of any support or implementation of redundancy removal for road lane detection data, the map display 301 indicates road lane detection data associated with lane markings with a lot of inaccuracies and redundancies. For example, for a road link 303, there are a plurality of associated road lane detections displayed on the GUI 300. These plurality of road lane detections include a road lane detection 305, a road lane detection 307, a road lane detection 309, and a road lane detection 311. Out of these plurality of road lane detections, it may be observed that the road lane detection 307, the road lane detection 309, and the road lane detection 311 seem redundant, as they overlap to a great extent with the road lane detection 305.

The plurality of road lane detections 305-311 depicted on the GUI 300 are detected by one or more on-board sensors of the vehicle associated with the user equipment 107a and/or the user equipment 107b and are fed to the map data. Because of the redundancies, such as the road lane detections 307-311, which as illustrated in FIG. 3 are short in length and parallel to the main detection 305, the overall quality of the sensor data, and ultimately the map data is compromised. Sometimes such inaccurate map data may be hazardous, as use of this data may lead to incorrect navigation decisions and instructions, which in turn may cause accidents.

Therefore, the various systems and methods disclosed in FIG. 4-FIG. 10 and based on the architecture and modules already disclosed in FIG. 1 and FIG. 2 are used to address this problem of low data quality of map data.

FIG. 4 illustrates a high-level block diagram of a method 400 for identifying redundant road lane detections, in accordance with one or more example embodiments. The road lane detections are associated with lane markings, which may define a border (or a boundary) of one particular lane of a road link, a border (or a boundary) of the road link, and/or a shared border (or a shared boundary) between two lanes of the road link. These lane markings may be of different colors with respect to the color of the link, in order to distinguish them from the road link.

The method 400 includes, at step 401, detection of one or more road lanes by obtaining a plurality of road lane detections associated with the road link based on sensor data. The road link data in turn may be obtained from map data, such as by map-matching a location of the vehicle (as captured by vehicles' sensors) capturing the corresponding road lane detection, with the map data, to identify the corresponding road link.

Further, at step 403, the method 400 includes performing an operation to determine a cluster associated with the road link by sequentially clustering at least some of the plurality of road lane detections according to a clustering criterion. The clustering criterion includes the matched distance criterion. After the clustering step 403, one or more clusters may be identified for each road link, and within each cluster, at least some of the road lane detections are identified, which satisfy the clustering criterion for that cluster. When matched distance is used as the clustering criterion, all the road lane detections that have same or equal matched distance, fall into a single cluster. The clustering criterion will be discussed in greater detail in FIG. 5.

Then, at step 405, for each cluster, one or more road lane detection groups are established based on the connectivity of the individual road lane detections in each cluster. The connectivity is determined by either respectively grouping any road lane detections of the cluster that are connected with one another, or by establishing a given road lane detection group respectively for each unconnected road lane detection of the cluster. The purpose of establishing one or more road lane detection groups is to identify a length scale for the road lane detections. Based on the length scale, major and minor road lane detections respectively, are segregated. The major road lane detections include a greater number of connected individual road lane detections, while the minor road lane detections include lesser number of connected road lane detections.

Once the plurality of road lane detection groups is established for each cluster, redundant road lane detections are identified by performing either or both of a heading check at 407, and a parallel lane check at 409. The parallel check 407 includes a parallel-detection criterion and the heading check 409 includes a heading difference criterion.

In some embodiments, the parallel-detection criterion includes identifying two or more parallel road lane detection groups and determining their respective lengths. The parallel road lane detection groups may be established based on image-based analysis or based on their orientation data available from the map database 103a, or a combination thereof. Further, based on the length, they are classified as major and minor detections. In some embodiments, minor detections are deemed as redundant while in other embodiments, major detections are deemed as redundant.

In some embodiments, the heading difference criterion includes identifying a heading associated with each road lane detection in a group, and also identifying a group heading associated with each road lane detection group. Heading is a measure of orientation for any sensor data observation and is generally calculated with respect to due north direction. Heading associated with a road lane detection may include an orientation or heading value for that corresponding road lane detection, as available from map data. So, when the road lane detection represents a road lane detection point or line segment with associated location coordinates, the heading value for that road lane detection may be obtained either from map data or based on driving direction of the vehicle that captured that road lane detection data.

The group heading value on the other hand, is calculated by aggregating all the heading values of all the road lane detections in that particular road lane detection group. The aggregation may be based on any known aggregation functions, such as summation, average, median, mode or the like, without deviating from the scope of the present disclosure. Once the road lane detection heading value and group heading value are known, a heading difference value is calculated for each road lane detection in the group. Then, the heading difference value is compared to a predetermined heading difference value threshold, and the road lane detection having the heading difference value more than a predetermined heading difference value threshold is identified as the redundant road lane detection. The reason for this heading difference comparison is that large heading difference indicates diagonal road lane detections. The diagonality arises in scenarios such as when a vehicle capturing the road lane detection is changing lanes while travelling, or when the road lane detection itself captures diagonal links. These road lane detections can be a cause of error, and thus, need to be removed.

In some embodiments, the method 400 further includes removing the redundant road lane detections from the map data, to update the map data. The step of removing the redundant road lane detections is not shown in the FIG. 4 for the sake of brevity. However, the removal may be performed by method 400, without deviating from the scope of the present disclosure, as may be contemplated by a person of ordinary skill in the art.

In some embodiments, each operation described in each block of the method 400 may be implemented in the form of computer-executable instructions, which are stored in a memory, such as the memory 203 associated with the system 101. Further, the computer-executable instructions when executed, cause the various operations of the method 400 to be performed by at least one processor, such as the processor 201 associated with the system 101. For example, the processor 201 may be configured to carry out the operation associated with generation of one or more clusters for each road link based on a clustering criterion, as illustrated in FIG. 5.

FIG. 5 illustrates a high-level block diagram of a method 500 of operations for determination of clusters for road lane detections, such as at step 403 of the method 400. The operations of the method 500 may be carried out by the clustering module 201b described in conjunction with FIG. 2.

The method 500 depicts exemplary data used for carrying out the clustering operation, where the data includes a road link 501, a plurality of road lane detections including: a road lane detection 503, a road lane detection 505, a road lane detection 507, a road lane detection 509, a road lane detection 511, and a road lane detection 513.

The plurality of road lane detections may be associated with plurality of lane markings on the road link boundary. Each road lane detection corresponds to sensor data observation captured by a vehicles' on-board sensor, for a corresponding road link boundary demarcated by the lane marking. The road link boundary could either be a left side link boundary, a right-side link boundary or a shared link boundary between the link and a second link, with respect to a direction of travel of the vehicle. Each road lane detection may have an associated matched distance, corresponding to a distance of separation of the road lane detection from the road link. For calculation purpose, the road link may 501 be represented as a line segment based on map-data, and each of the plurality of road lane detections 503-513 are represented as line segments placed at a their respective distance of separation from the road link 501, and laterally depicted as either on the left or the right side of the road link 501, based on their placement on the road link 501 with respect to the direction of travel of the vehicle from which the respective road lane detection was captured.

In some embodiments, the left side road lane detections are represented by a matched distance having a negative sign, such as a minus sign "−", while the right-side road lane detections are represented by a matched distance having a "+" sign. For example, if the distance of separation of the road lane detection 505 from the road link 501 is 2 meters, and vehicle's travel direction is from left to right, then the road lane detection 505 may be considered to have the matched distance as "−2 m". Similarly, if the distance of separation of the road lane detection 507 from the road link 501 is 3 meters, and vehicle's travel direction is from left to right, then the road lane detection 507 may be considered to have the matched distance as "+3 m". The matched distance may be identified based on map data, such as using link coordinates from map data, vehicle's location coordinates, and lane width for the road link 501 from map data. The lateral distance between the road lane detections on the left side link boundary and right-side link boundary of a road link should be equal to the lane width (such as 3-4 meters on freeway).

Further, as can be seen from FIG. 5, the road lane detections 503 and 505 are on the left side of the road link 501 and have nearly same matched distances. Similarly, the road lane detections 507-513 are on the right side of the road link 501 and have nearly same matched distances. An unsupervised clustering method such as Density-Based Spatial Clustering of Applications with Noise (DBSCAN) or K-means on the matched distance of these plurality of road lane detections 503-513 can distinguish which boundary each of the plurality of road lane detections 503-513 belong to, thus cluster the road lane detections according to their matched distance and/or lateral placement. For instance, in the FIG. 5, there are two clear clusters for the plurality of road lane detections 503-513: (i) a cluster 1 including the road lane detections 503 and 505, and (ii) a cluster 2 including the road lane detections 507-513, which are generated based on matched distance (and lateral position) as the clustering criterion.

Thus, for the road link 501 one or more such clusters are generated such that each cluster includes at least some of the plurality of road lane detections. For example for FIG. 5, two clusters that are generated are: (i) cluster 1: [road lane detection 503, road lane detection 505], (ii) cluster 2: [road lane detection 507, road lane detection 509, road lane detection 511, road lane detection 513].

After such clusters are generated, the road lane detections in each cluster are further processed by grouping, which is discussed in conjunction with FIG. 6A.

FIG. 6A illustrates a flow diagram of a method 600a for establishing a plurality of road lane detection groups for the plurality of road lane detections. For example, the grouping module 201c may be configured to execute instructions to configure the processor 201 to carry out operations to establish a plurality of road lane detection groups.

The method 600a may be implemented, for example on the plurality of road lane detections 503-513. The plurality of road lane detection groups may be established by one or more of (i) respectively grouping any road lane detections of a cluster that are connected with one another, or (ii) establishing a given road lane detection group respectively for each unconnected road lane detection of the cluster.

The method 600a comprises a recursive lane grouping method pipeline for each cluster which begins at step 601. At 601, method 600a includes to check if there are any ungrouped road lane detections in a cluster. The cluster includes at least some of the plurality of road lane detections, which have been clustered together on the basis of matched distance. For example, referring to FIG. 5, there are two clusters as discussed previously, cluster 1: [road lane detection 503, road lane detection 505], (ii) cluster 2: [road lane detection 507, road lane detection 509, road lane detection 511, road lane detection 513]. When the method 600a begins, there are no identified groups, so the checking at 601 proceeds to "Yes" branch, which leads, at 603, to create a label for the first ungrouped detection. This will be explained in conjunction with FIG. 6B, which represents the exemplary scenario of FIG. 5, but after generating clusters and groups.

For example, as illustrated in FIG. 6B, for the cluster 1 (also hereinafter referred to as C1), a first label corresponding to a first road lane detection group C1G1 may be generated, comprising the road lane detection 503. Then, at 605, road lane detections with a current label, such as C1G1 in this case are identified. For example, in FIG. 6B, the road lane detection 503 is identified as associated with one road lane detection with label C1G1, so the count at 605 for road lane detection 503 is 1. Then, at 607, road lane detections connected with road lane detection 503 with the current label, such as C1G1 are identified, and at 611, their number or count is checked. For road lane detection 503, there are no other connected road lane detections, so the count is 1, at 611.

Further, at 613, the count of road lane detections connected to the current road lane detection, such as road lane detection 503, is compared with the number of road lane detections identified at 605, that is before beginning checking of connected road lane detections for the current road lane detection. If the number or count at 611 is same as the count at 605, then the method 600 loops back to step 601 and continues checking for any ungrouped road lane detections.

However, at 613, if the count at 611 is not same as the count at 605, the count is updated (such as increased by 1) and the method 600 loops back to step 607 where more road lane detections connected with the current road lane detection are identified.

The method 600 continues iteratively, till at 601, it is identified that there are no more ungrouped lane detections.

For example, referring to FIG. 6B, after label C1G1 is identified for road lane detection 503 at step 605, going through steps 607 to 611, it is identified that there are no connected road lane detections to the road lane detection 503, therefore, at 613, the count of connected road lane detections remains same at 1. This is because the road lane detection 503 is a continuous road lane detection. The method 600 returns back to 601, where the next set of ungrouped road lane detections is identified. For example, in the cluster C1, the next road lane detection is 505, so it is given a label at 603. The label is, for example, C1G2. Then the method steps 605-613 are repeated to check if there are any road lane detections connected to the road lane detection 505. Since there are no connected road lane detections to the road lane detection 505, therefore, the method 600 returns back to step 601, where it is checked if there are more ungrouped road lane detections in the cluster C1. As there are no more ungrouped road lane detections in the cluster C1, so the method 600a stops. At the end of the iterations for the cluster C1, two groups are identified for the cluster C1: (i) C1G1: [road lane detection 503], and (ii) C1G2: [road lane detection 505].

Similarly, the method 600a is implemented for cluster C2 shown in FIG. 6B. For cluster C2, the first road lane detection 507 is given label C2G1, and there are no connected road lane detections to the road lane detection 507, so next ungrouped road lane detection is checked. If the next ungrouped road lane detection is road lane detection 511, so a label C2G2 is generated for this. Further the road lane detection 511 is connected to road lane detection 513, therefore, at 611, number of road lane detections with label C2G2 is identified as 2, and the count at 609 is updated to 2. Further, the loop of checking more connected road lane detections continues between 605 and 611, and it is identified that there are no more connected road lane detections to be included in the group C2G2. Therefore, the road lane detection group C2G2 is established as having road lane detections 511 and 513.

Similarly, the last ungrouped road lane detection of the cluster C2, that is the road lane detection 509 is given a label C2G3. As can be seen from FIG. 5 and FIG. 6B, the road lane detection 509 is intersecting the road lane detection 511 at a point other than border points of any of the road lane detections 509 or 511. As has been discussed earlier as well, a border point is an end point of the road lane detection (or an end point of a line segment representing the road lane detection). Therefore, the road lane detection 509 cannot be considered to be connected to the road lane detection 511, even though it appears to overlap and/or intersect with the road lane detection 511. So, the road lane detection 509 is an unconnected road lane detection of the cluster C2, which is not connected to any other road lane detections (511 or 513), by virtue of the connectivity based on border point specified herein. Thus, for cluster 2, three road lane detection groups are established: (i) C2G1: [road lane detection 507], (ii) C2G2: [road lane detection 511, road lane detection 513], and (iii) C2G3: [road lane detection 509].

In this manner, a plurality of road lane detection groups may be established for each cluster by using method 600a.

Further, the plurality of road lane detection groups may be evaluated to identify one or more redundant road lane detections. For this, parallel-detection criterion, or a heading-difference criterion may be used, as illustrated in FIG. 7 and FIG. 8.

FIG. 7 illustrates a schematic diagram 700 illustrating identification of redundant road lane detections based on a heading difference criterion. For example, the redundant lane detection identification module 201d may be configured to execute instructions to configure the processor 201 to carry out operations to identify redundant road lane detections based on the heading-difference criterion.

For the road lane detections in the same group, that are connected to each other there may be many possibilities. For example, two downstream road lane detections may be connected to the same upstream road lane detection. For the purpose of considering in the present disclosure, "upstream" may refer to a road lane detection that occurs earlier in sequence, while "downstream" may refer to a road lane detection that occurs later in sequence, with reference as a considered travel direction (for example direction of travel of a vehicle travelling on the road link and capturing the road lane detection). In this scenario, out of the two downstream road lane detections that are connected to the same upstream road lane detection, one may be redundant. This will be identified based on the heading difference criterion which will be explained with reference to example in schematic diagram 700 of FIG. 7.

The schematic diagram 700 shows, by way of example only, two clusters C1 and C2. The cluster C1 has one group C1G1', while cluster C2 has two groups, C2G1' and C2G2'. There are a plurality of road lane detections: an upstream lane detection 701', an upstream lane detection 703, a downstream road lane detection 701, a downstream road lane detection 705, an upstream road lane detection 707, and an upstream road lane detection 709. For purpose of example illustrated in FIG. 7, D1 is reference link direction. These plurality of road lane detections are established as belonging to different clusters and different groups as follows:

Group C1G1': [upstream road lane detection 701', downstream road lane detection 701, upstream road lane detection 703];

Group C2G1': [downstream road lane detection 705, upstream road lane detection 707];

Group C2G2': [upstream road lane detection 709];

Out of all the road lane detections in a group, the road lane detections with larger heading difference value with respect to a group heading value (which may be a measure of an upstream heading value), are identified as the redundant ones.

For example, for group C1G1', each road lane detection is associated with a road lane detection heading value. For purposes of explanation it may be considered that in group C1G1', the upstream road lane detection 701' has a road lane detection heading value H1, the downstream road lane detection 701 has a road lane detection heading value H2, and the upstream road lane detection 703 has a road lane detection heading value H3. Further, based on H1, H2, and H3, a group heading value may be identified for the group C1G1'. The group heading value for the group C1G1' may be G1. The group heading value G1 may be identified as a function of the heading values H1, H2, and H3, where the function may be an average function, a median function, a mode function, or any other aggregation function known in mathematical, computational, and statistical domain, without deviating from the scope of the present disclosure. For example, if the aggregation function is the average function, then G1 may be calculated as:

$$G1 = (H1 + H2 + H3) \div 3 \qquad \text{Eq. (1)}$$

Here denominator is considered as 3 because there are only three road lane detections in the group C1G1'. However, as may be understood by a person of ordinary skill in the art, this number may be adjusted based on the number of road lane detections in a group, without deviating from the scope of the present invention.

Once the group heading G1 has been determined as discussed in Eq. (1) above, a heading difference value may be calculated for each road lane detection in the group. Thus, for the group C1G1', the heading difference values may be calculated as:

Diff 1: G1−H1, for the upstream road lane detection 701';
Diff 2: G1−H2, for the downstream road lane detection 701; and
Diff 3: G1−H3, for the upstream road lane detection 703.

Further, each of these heading difference values Diff 1, Diff 2, and Diff 3 may be compared with a predetermined heading difference value threshold, T1. The predetermined heading difference value threshold T1 may be a configurable value that may have been obtained based on experimental results. For example in some cases, T1 may be set as 10 degrees. Based on the comparison of each of the heading difference values with the predetermined heading difference value threshold, the road lane detection with the respective heading difference value greater than the predetermined heading difference value threshold is identified as a redundant road lane detection of the associated group. For example, based on FIG. 7, it may be seen that the upstream road lane detection 703 with heading difference value Diff 3, is found to have Diff 3>T1, therefore, the upstream road lane detection 703 is identified as a redundant road lane detection in the group C1G1'.

Similarly, for group C2G1', the upstream road lane detection 707 may be identified as the redundant road lane detection, because it appears to have larger heading difference than the other road lane detections, and thus, the group heading value.

In some embodiments, such redundant road lane detections that are identified based on heading difference value check, may have been captured due to a vehicle changing lanes while driving, or due to diagonal links, thus, giving rise to erroneous sensor data capture. Identifying these as redundant road lane detections helps to improve the accuracy of the overall sensor data.

Further, another check to identify redundant road lane detections is the parallel-detection criterion, which is explained next in FIG. 8. For example, the redundant lane detection identification module 201d may be configured to execute instructions to configure the processor 201 to carry out operations to identify redundant road lane detections based on the parallel-detection criterion.

FIG. 8 illustrates a schematic diagram 800 illustrating identification of redundant road lane detections based on a parallel length criterion. The schematic diagram 800 illustrates a plurality of road lane detections: a road lane detection 801, a road lane detection 803, a road lane detection 805, a road lane detection 807, a road lane detection 809, a road lane detection 811, and a road lane detection 813. Further, there are two clusters in the schematic diagram 800, a cluster C1 and a cluster C2, which may be generated based on matched distance criterion. Further, for cluster C1, there are two groups, a first group C1G1" and a second group C1G2". The second cluster comprises three groups, a third group C2G1", a fourth group C2G2", and a fifth group C2G3". The road lane detections in each group are as follows:

C1G1": [road lane detection 801, road lane detection 803];
C1G2": [road lane detection 805];
C2G1": [road lane detection 807, road lane detection 809];
C2G2": [road lane detection 811];
C2G3": [road lane detection 813];

The road lane groups are established based on connectivity of the individual road lane detections, as already explained in FIGS. 6A-6B. For all reference considerations in FIG. 8, the road link reference direction is taken as D1.

Within the same cluster, there can be multiple parallel road lane detections, which are part of different road lane groups. Further, because each road lane detection group is constituted of one or more connected road lane detections, therefore, it can be equivalently considered that two road lane detections may be parallel, when the one or more road lane detections that each respective group constitutes are either partially or totally parallel to each other. For example, in FIG. 8, the road lane detection 805 is parallel to the road lane detection 801 and the road lane detection 803. Therefore, it may be identified that the first group C1G1" constituted of the road lane detections 801 and 803, is parallel to the second group C1G2" constituted of the road lane detection 805. Similarly, for cluster 2, C2, the fourth group C2G2" is parallel to each of the groups, the third group C2G1" and the fifth group C2G3".

In an embodiment, the parallel check is performed based on image data associated with the plurality of road lane detections. In other embodiments, the dimensional, location, and heading data associated with the road lane detections, as obtained from the map database 103a, is used to identify if two road lane detections are parallel to each other or not.

Further, once two road lane detection groups are identified as being parallel to each other, a respective length associated with each of the two road lane detection groups is identified. The length of any road lane detection group is the total of the individual lengths of each of the road lane detections constituting that group. For example, the length of the first group C1G1" is total of the lengths of the road lane detection 801 and the road lane detection 803, let it be L1 for exemplary purpose. The length of the second group C1G2" is the length of the road lane detection 805, let it be L2 for exemplary purpose. Similarly, lengths of other groups may be identified. For example, let the length of the third group C2G1" be L3, let the length of the fourth group C2G2" be L4, and let the length of the fifth group C2G3" be L5.

The lengths of the individual road lane detections may be identified based on image data associated with the plurality of road lane detections in some embodiments. In other embodiments, the dimensional, location, and heading data associated with the road lane detections, as obtained from the map database 103a, may be used to identify the lengths of the individual road lane detections.

Further, the length of each respective road lane detection group is used to decide, whether that road lane detection is a redundant road lane detection or not. The lengths of the groups may classify each group as either a major road lane detection or a minor road lane detection in a cluster. The major road lane detection is a group with longer length, while the minor road lane detection is the group with shorter length.

For example, as illustrated in FIG. 8, for cluster 1, the first group C1G1" is the longer group and the second group C1G2", such that L1>L2. That is to say, the first group C1G1" is the major road lane detection and the second group C1G2" is the minor road lane detection. Therefore, the road lane detection 805 of the second group C1G2" is identified as the redundant road lane detection.

Similarly, for cluster 2, it may be observed that the fourth group C2G2" has the shortest length. That is L4<L3 and L4<L5. Therefore, the road lane detection 811 of the fourth group C2G2" is identified as the redundant road lane detection.

In some embodiments, however, the longer groups may be considered as having the redundant road lane detections. In that scenarios, for the example considered in FIG. 8, for the cluster 1, the first group C1G1" and its associated road lane detections 801 and 803 are considered redundant.

In either of the embodiments discussed above, once the redundant road lane detections are identified, a computer-implemented update process to remove the identified one or more redundant road lane detections from the map data may be performed. For example, the updating module 201e may be configured to execute instructions to configure the processor 201 to carry out operations to update the map data, such as the data stored in the map database 103a, to remove any redundant road lane detection data, and thereby improving the overall quality of the map data and the services of the mapping platform 103.

FIG. 9 illustrates a flow diagram of a method 900 for identifying redundant road lane detections. It will be understood that each block of the flow diagram of the method 900 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by the memory 203 of the system 101, employing an embodiment of the present invention and executed by the processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow chart support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 900 is configured to implement operations to, at 901, determine a plurality of road lane detections associated with a road link represented by map data based on sensor data. The sensor data may include data captured by a vehicles' on-board sensors, while travelling on a route comprising one or more road links. The plurality of road lane detections may be associated with plurality of lane markings corresponding to one or more lanes on a road link represented by map data. The road lane detections may be captured by the sensors including, but not limited to, a camera, a LIDAR sensor, a proximity sensor, and the like. The road lane detections may be associated with road lane detection data, such as data about location of the road lane detection on the link or on the map in terms of its location coordinates, timestamp associated with capturing of the sensor data associated with the road lane detection, lateral position data for the road lane detection, image data of the road lane detection, length of the road lane detection, heading data associated with the road lane detection and the like. For instance, the reception module 201a associated with the processor 201 of the system 101 may be configured to carry out the operations to determine the sensor data associated with the plurality of road lane detections depicted in any of the figures FIG. 3, FIG. 5, FIG. 7, or FIG. 8.

Further, the method 900 is configured to implement operations to, at 903, to determine a cluster associated with the road link, the cluster including at some of the plurality of road lane detections determined at step 901. Further, the cluster is determined in accordance with a clustering criterion. The clustering criterion may comprise a matched distance, which is a distance of separation of the road lane detection from the road link, as identified based on the map data. Further, at least some of the plurality of road lane detections which have the same matched distance are classified into one cluster. In some embodiments, the lateral position of the road lane detection on the road link is also used as the clustering criterion, either alone or in combination with the matched distance. For instance, referring to FIG. 5, there are two clear clusters for the plurality of road lane detections 503-513: (i) a cluster 1 including the road lane detections 503 and 505, and (ii) a cluster 2 including the road lane detections 507-513, which are generated based on matched distance (and lateral position) as the clustering criterion.

Further, the method 900 includes operations to, at 905, establish a plurality of road lane detection groups based on connectivity of the road lane detections. For example, for each cluster, a recursive method for respectively grouping any road lane detections of the cluster that are connected with one another may be performed. Additionally, each unconnected road lane detection of the cluster is associated with another road lane detection group. For instance, the method 600a illustrated in FIG. 6A may be implemented, such as by the grouping module 201c of the system 100, for establishing the plurality of road lane detection groups. The corresponding plurality of groups formed by the method 600a are illustrated in FIG. 6B, such as groups C1G1, C1G2, C2G1, C2G3, and C2G3.

Further, the method 900 includes operations to, at 907, identify from among the plurality of road lane detections, one or more redundant road lane detections. For this identification, one or more of the plurality of road lane detection groups established at step 905 are evaluated one by one, according to one or more of a parallel-detection criterion or a heading difference criterion.

The parallel detection criterion includes first identifying at least two road lane detection groups in a cluster that are parallel to each other, such as by virtue of having parallel road lane detections. And then, a respective length associated with each of the at least two road lane detection groups are determined. Based on this length, one group corresponds to a major detection, by having the longer length, and the other group corresponds to a minor detection by having the shorter length. Further, as explained previously in reference to FIG. 8, the length of a group may be the total of the individual lengths of the road lane detections in that group. Further, based on the respective length, one or more redundant road lane detections are identified. For example, the group with shorter length is identified as group of redundant road lane detections, the corresponding road lane detection are identified as the one or more redundant road lane detections.

The heading difference criterion for identifying one or more redundant road lane detections comprises determining a road lane detection heading value for each road lane detection in a group. Further, a group heading value may be calculate as an aggregate of heading value of all the road lane detections in the group. The aggregation may be performed such as based on summation, average, median, weighted median, and the like, of individual road lane detection heading values. Then a heading difference value between the road lane detection heading value of each road lane detection and the group heading value is calculated. Based on this heading difference value, the respective road lane detection is identified either as a redundant road lane detection or a non-redundant road lane detection. For example, when the heading difference value of the road lane detection is more than a predetermined heading difference value threshold, then the corresponding road lane detection is identified as the redundant road lane detection.

Then, the method 900 is configured to implement an operation to, at 909, perform a computer-implemented process to remove the identified redundant road lane detections from map data. After the road lane detections for the associated road link are identified using all of the operations and checks described, it is imperative to use all this learning and determination to improve the overall quality of the map data. The map data, such as data about the road link stored in the map database 103a and illustrated in greater detail in FIG. 1B-FIG. 1D, is updated to remove or delete or truncate or nullify the data about the road lane detections which are redundant. In some embodiments, removal includes deletion of redundant road lane data and records from the map database 103a. In other embodiments, removal includes freeing up memory associated with redundant road lane records in the map database 103a. In yet other embodiments, removal includes updating the road lane data in the map database 103a frequently, such as in near-real time, such that as soon as a record of road lane data is identified as redundant, it is excluded from the next update iteration of the map database 103a.

The update process of map data stored in the map database 103a in this manner ensures that only very high-quality data is available for all navigation related services using the mapping platform 103. For example, for guided or unaided navigation in a manual, semi-autonomous, or autonomous vehicle, the updated high quality map data performs a superior, accurate, safe, and reliable navigation, as compared to navigation services based on redundant faulty data. The use of such map data in a real-time working scenario is illustrated in FIG. 10.

FIG. 10 illustrates a diagrammatic representation of a working environment 1000 of the system and the method for identification of redundant road lane detections and updating of map data.

The working environment 1000 includes a road link 1000 comprising two lane markings, a lane marking 1007 and a lane marking 1009. Two vehicles, a vehicle 1003 and 1005 are traversing a route while navigation that includes the road link 1001. Each of the two vehicles 1003 and 1009, may correspond to any one of: an autonomous vehicle, a semi-autonomous vehicle, or a manual vehicle. As used herein, the autonomous vehicle may be a vehicle that is capable of sensing its environment and operating without human involvement. For instance, the autonomous vehicle may be a self-driving car and the like. As used herein, the 'vehicle' may include a motor vehicle, a non-motor vehicle, an automobile, a car, a scooter, a truck, a van, a bus, a motorcycle, a bicycle, a Segway, and/or the like.

Each of the two vehicles may be equipped with a plurality of sensors such as a camera, a LiDAR sensor, an accelerometer, a gyroscope, a RADAR sensor, an RFID sensor, and the like. Using any or a combination of the plurality of sensors, the each of the two vehicles may be configured to obtain sensor data associated with detection of the lane markings 1007 and 1009. This data may be referred to as the plurality of road lane detections.

Thereafter, in one embodiment, the each of the two vehicles 1003 and 1005, transmit the road lane detection data to the mapping platform 103, via the network 105. The mapping platform 103 in turn is associated with the system 101, which may be an on-premises or cloud-based system, and thus may be integrated within the mapping platform 103 or connected to the mapping platform 103 via the network 105. In either which way, the system comprises the processor 201 (illustrated in FIG. 2), which is then configured to perform further processing on the road lane detection data thus received, such as using the reception module 201a.

Further, the clustering module 201b is configured to determine a cluster associated with the road link 1001 based on the received road lane detection data and in accordance with a clustering criterion. The cluster includes at least one of the road lane detections for each of the road lane markings 1007 and 1009. The clustering criterion comprises matched distance of each of the road lane markings 1007 and 1009 from a center line of the link 1001. As these two-lane markings 1007 and 1009 are on opposite ends of the center line of the link 1001, therefore they have different matched distances, and thus, two different clusters are generated.

Thereafter, the grouping module 201c is configured to operate on each of the two clusters to establish a plurality of road lane detection groups. This is done by (i) respectively grouping any road lane detections of the cluster that are connected with one another, and (ii) establishing a given road lane detection group respectively for each unconnected road lane detection of the cluster. Such grouping is illustrated in the example of FIG. 6A-6B.

Further, the redundant lane detection identification module 201d is configured to identify one or more redundant road lane detections by evaluating the plurality of road lane detection groups formed for the lane markings 1007 and 1009. The evaluation is done based on a parallel-detection criterion or a heading-difference criterion (which are explained previously). As a result of this evaluation, if any redundant road lane detections are identified, they are removed from map data of the mapping platform 103 by performing a computer-implemented update process.

Thereafter, the improved updated data may be used by the vehicles 1003 and 1005, and other such vehicles, while using the navigation related services provided by the mapping platform 103. Some non-limiting examples of the navigation related services include providing vehicle speed guidance, vehicle speed handling and/or control, providing a route for navigation (e.g., via a user interface), localization, route determination, lane level speed determination, operating the vehicle along a lane level route, route travel time determination, lane maintenance, route guidance, provision of traffic information/data, provision of lane level traffic information/data, vehicle trajectory determination and/or guidance, route and/or maneuver visualization, and/or the like.

In some embodiments, the vehicles 1003 and 1005, themselves include the system 101 for performing the redundant road lane detection identification and map data update processing. Further, the number of vehicles and the number of lane markings in FIG. 10 are limited to two, only for the purpose of brevity of explanation. However, in practical implementation, any number of vehicles, and any number of lane markings may be used, without deviating from the scope of the present disclosure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for identifying redundant road lane detections, the system comprising:
    a memory configured to store computer-executable instructions; and
    at least one processor configured to execute the computer-executable instructions to:
    determine, based on sensor data, a plurality of road lane detections associated with a road link represented by map data;
    determine a cluster associated with the road link in accordance with a clustering criterion, the cluster including at least some of the plurality of road lane detections;
    establish a plurality of road lane detection groups by one or more of (i) respectively grouping any road lane detections of the cluster that are connected with one another, or (ii) establishing a given road lane detection group respectively for each unconnected road lane detection of the cluster;
    identify, from among the plurality of road lane detections, one or more redundant road lane detections by evaluating one or more of the plurality of road lane detection groups according to one or more of a parallel-detection criterion or a heading-difference criterion, wherein identification of the one or more redundant road lane detections according to the heading-difference criterion includes (i) a determination for each road lane detection in a road lane detection group of the plurality of road lane detection groups a road lane detection heading value, (ii) a determination for the road lane detection group a group heading value, (iii) a calculation of a heading difference value between the road lane detection heading value of each road lane detection and the group heading value, and (iv) a detection of the road lane detection having the heading difference value more than a predetermined heading difference value threshold as the redundant road lane detection; and
    perform a computer-implemented update process to remove the identified one or more redundant road lane detections from the map data.

2. The system of claim 1, wherein determining the cluster associated with the road link comprises:
    determining, for each road lane detection in the plurality of road lane detections, a corresponding matched distance based on a distance of separation of the road lane detection from the road link, wherein the distance of separation is identified based on the map data; and
    determining the cluster associated with the road link by using the matched distance as the clustering criterion, such that the cluster includes at least some of the plurality of road lane detections which have the same matched distance.

3. The system of claim 1, wherein identifying the one or more redundant road lane detections by evaluating one or more of the plurality of road lane detection groups according to the parallel-detection criterion comprises:
    identifying at least two road lane detection groups in the plurality of road lane detection groups that are parallel to each other;
    determining a respective length associated with each of the at least two road lane detection groups; and
    identifying the one or more redundant road lane detections based on the respective length associated with each of the at least two road lane detection groups.

4. The system of claim 3, wherein identifying the one or more redundant road lane detections comprises identifying the road lane detections associated with road lane detection group with shorter respective length as the one or more redundant road lane detections.

5. The system of claim 3, wherein identifying the one or more redundant road lane detections comprises identifying the road lane detections associated with road lane detection group with longer respective length as the one or more redundant road lane detections.

6. The system of claim 1, wherein identifying the one or more redundant road lane detections comprises: evaluating the one or more of the plurality of road lane detection groups according to a lateral position criterion associated with lateral placement of each road lane detection on the road link.

7. The system of claim 1, wherein the at least one processor is further configured to generate one or more navigation instructions based on the updated map data.

8. A method performed by at least one or more processors, the at least one or more processors configured to execute computer-executable instructions associated with the method for identifying redundant road lane detections, the method comprising:
  determining, based on sensor data, a plurality of road lane detections associated with a road link represented by map data;
  determining a cluster associated with the road link in accordance with a clustering criterion, the cluster including at least some of the plurality of road lane detections;
  establishing a plurality of road lane detection groups by one or more of (i) respectively grouping any road lane detections of the cluster that are connected with one another, or (ii) establishing a given road lane detection group respectively for each unconnected road lane detection of the cluster;
  identifying, from among the plurality of road lane detections, one or more redundant road lane detections by evaluating one or more of the plurality of road lane detection groups according to one or more of a parallel-detection criterion or a heading-difference criterion, wherein identifying the one or more redundant road lane detections according to the heading-difference criterion includes (i) determining for each road lane detection in a road lane detection group of the plurality of road lane detection groups a road lane detection heading value, (ii) determining for the road lane detection group a group heading value, (iii) calculating a heading difference value between the road lane detection heading value of each road lane detection and the group heading value, and (iv) detecting the road lane detection having the heading difference value more than a predetermined heading difference value threshold as the redundant road lane detection; and
  performing a computer-implemented update process to remove the identified one or more redundant road lane detections from the map data.

9. The method of claim 8, wherein determining the cluster associated with the road link comprises:
  determining, for each road lane detection in the plurality of road lane detections, a corresponding matched distance based on a distance of separation of the road lane detection from the road link, wherein the distance of separation is identified based on the map data; and
  determining the cluster associated with the road link by using the matched distance as the clustering criterion, such that cluster includes at least some of the plurality of road lane detections which have the same matched distance.

10. The method of claim 8, wherein identifying the one or more redundant road lane detections by evaluating one or more of the plurality of road lane detection groups according to the parallel-detection criterion, comprises:
  identifying at least two road lane detection groups in the plurality of road lane detection groups that are parallel to each other;
  determining a respective length associated with each of the at least two road lane detection groups; and
  identifying the one or more redundant road lane detections based on the respective length associated with each of the at least two road lane detection groups.

11. The method of claim 10, further comprising:
  identifying the road lane detections associated with road lane detection group with shorter respective length as the one or more redundant road lane detections.

12. The method of claim 10, further comprising identifying the road lane detections associated with road lane detection group with longer respective length as the one or more redundant road lane detections.

13. The method of claim 8, wherein identifying the one or more redundant road lane detections further comprises evaluating the one or more of the plurality of road lane detection groups according to a lateral position criterion associated with lateral placement of each road lane detection on the road link.

14. The method of claim 8, further comprising to generating one or more navigation instructions based on the updated map data.

15. A computer program product comprising a non-transitory computer readable medium having stored thereon computer executable instruction which when executed by at least one processor, cause the at least one processor to carry out operations for identifying redundant road lane detections, the operations comprising:
  determining, based on sensor data, a plurality of road lane detections associated with a road link represented by map data;
  determining a cluster associated with the road link in accordance with a clustering criterion, the cluster including at least some of the plurality of road lane detections;
  establishing a plurality of road lane detection groups by one or more of (i) respectively grouping any road lane detections of the cluster that are connected with one another, or (ii) establishing a given road lane detection group respectively for each unconnected road lane detection of the cluster;
  identifying, from among the plurality of road lane detections, one or more redundant road lane detections by evaluating one or more of the plurality of road lane detection groups according to one or more of a parallel-detection criterion or a heading-difference criterion, wherein identifying the one or more redundant road lane detections according to the heading-difference criterion includes (i) determining for each road lane detection in a road lane detection group of the plurality of road lane detection groups a road lane detection heading value, (ii) determining for the road lane detection group a group heading value, (iii) calculating a heading difference value between the road lane detection heading value of each road lane detection and the group heading value, and (iv) detecting the road lane detection having the heading difference value more than a predetermined heading difference value threshold as the redundant road lane detection; and
  performing a computer-implemented update process to remove the identified one or more redundant road lane detections from the map data.

16. The computer program product of claim 15, wherein determining the cluster associated with the road link comprises:
- determining, for each road lane detection in the plurality of road lane detections, a corresponding matched distance based on a distance of separation of the road lane detection from the road link, wherein the distance of separation is identified based on the map data; and
- determining the cluster associated with the road link by using the matched distance as the clustering criterion, such that cluster includes at least some of the plurality of road lane detections which have the same matched distance.

17. The computer program product of claim 15, wherein identifying the one or more redundant road lane detections by evaluating one or more of the plurality of road lane detection groups according to the parallel-detection criterion, comprises:
- identifying at least two road lane detection groups in the plurality of road lane detection groups that are parallel to each other;
- determining a respective length associated with each of the at least two road lane detection groups; and
- identifying the one or more redundant road lane detections with shorter respective group length as the one or more redundant road lane detections.

\* \* \* \* \*